US012592606B2

(12) United States Patent　(10) Patent No.:　US 12,592,606 B2
Goykhman et al.　(45) Date of Patent:　Mar. 31, 2026

(54) AXIAL FLUX MOTOR WITH AIR COOLING SYSTEM

(71) Applicant: EATON INTELLIGENT POWER LIMITED, Dublin (IE)

(72) Inventors: Mikhail Goykhman, Reseda, CA (US); Galen Lup Yin Chui, Ladera Ranch, CA (US); Armen Baronian, Toronto (CA); Piranavan Suntharalingam, Menomonee Falls, WI (US); Hongbin Wang, Novi, MI (US); Robert Anson Lau, Hamilton (CA); Federico Duperly, Georgetown (CA); Ehab Mohammed Mahmoud Sayed, Hamilton (CA); Alan Dorneles Callegaro, Hamilton (CA)

(73) Assignee: EATON INTELLIGENT POWER LIMITED, Dublin (IE)

( * ) Notice: Subject to any disclaimer, the term of this patent is extended or adjusted under 35 U.S.C. 154(b) by 128 days.

(21) Appl. No.: 17/775,220

(22) PCT Filed: Nov. 6, 2020

(86) PCT No.: PCT/EP2020/025498
§ 371 (c)(1),
(2) Date: May 6, 2022

(87) PCT Pub. No.: WO2021/089189
PCT Pub. Date: May 14, 2021

(65) Prior Publication Data
US 2022/0393527 A1　Dec. 8, 2022

Related U.S. Application Data

(60) Provisional application No. 62/931,712, filed on Nov. 6, 2019, provisional application No. 62/931,707, filed
(Continued)

(51) Int. Cl.
*H02K 1/27*　(2022.01)
*H02K 1/14*　(2006.01)
(Continued)

(52) U.S. Cl.
CPC .............. *H02K 5/203* (2021.01); *H02K 1/141* (2013.01); *H02K 1/16* (2013.01); *H02K 1/27* (2013.01);
(Continued)

(58) Field of Classification Search
CPC ............ H02K 1/16; H02K 16/02; H02K 1/27; H02K 7/003
See application file for complete search history.

(56) References Cited

U.S. PATENT DOCUMENTS 2,571,872 A　10/1951　Hayes
2,630,464 A　3/1953　Dunkelberger
(Continued)

FOREIGN PATENT DOCUMENTS

CN　205407546 U　7/2016
CN　206759275 U　12/2017
(Continued)

OTHER PUBLICATIONS

International Search Report and Written Opinion of the International Searching Authority for International Patent Application No. PCT/EP2020/025497 mailed Feb. 8, 2021, 17 pages.
(Continued)

*Primary Examiner* — Tulsidas C Patel
*Assistant Examiner* — Robert E Mates
(74) *Attorney, Agent, or Firm* — Merchant & Gould P.C.

(57) ABSTRACT

The present disclosure relates to an axial flux motor comprising a stator assembly and a rotor assembly. The axial flux motor rotor assembly also includes an air cooling arrangement to provide air cooling to the stator assembly. The axial
(Continued)

flux motor includes stator cores having enlarged end plates. The axial flux motor also includes a cooling jacket including fins that extend between electromagnets of the stator assembly.

25 Claims, 27 Drawing Sheets

Related U.S. Application Data on Nov. 6, 2019, provisional application No. 62/931, 702, filed on Nov. 6, 2019.

(51) Int. Cl.

| | |
|---|---|
| *H02K 1/16* | (2006.01) |
| *H02K 5/04* | (2006.01) |
| *H02K 5/20* | (2006.01) |
| *H02K 7/00* | (2006.01) |
| *H02K 9/16* | (2006.01) |
| *H02K 9/193* | (2006.01) |
| *H02K 16/02* | (2006.01) |
| *H02K 21/24* | (2006.01) |

(52) U.S. Cl.
CPC ............... *H02K 5/04* (2013.01); *H02K 7/003* (2013.01); *H02K 9/16* (2013.01); *H02K 9/193* (2013.01); *H02K 16/02* (2013.01); *H02K 21/24* (2013.01)

(56) References Cited

U.S. PATENT DOCUMENTS

| | | | |
|---|---|---|---|
| 3,261,995 A | | 7/1966 | Kohn |
| 4,710,667 A | * | 12/1987 | Whiteley ............... H02K 23/54 |
| | | | 310/407 |
| 6,300,693 B1 | | 10/2001 | Poag et al. |
| 6,661,133 B2 | | 12/2003 | Liebermann |
| 6,768,932 B2 | | 7/2004 | Claypole et al. |
| 7,675,209 B2 | | 3/2010 | Masoudipour et al. |
| 7,928,348 B2 | | 4/2011 | Neal |
| 8,022,593 B2 | | 9/2011 | Lamperth et al. |
| 8,093,770 B1 | | 1/2012 | Berhan |
| 8,183,723 B2 | | 5/2012 | Fee et al. |
| 8,342,612 B2 | | 1/2013 | Sgherri et al. |
| 8,508,085 B2 | | 8/2013 | Bradfield |
| 8,629,585 B2 | | 1/2014 | Bradfield |
| 8,803,380 B2 | | 8/2014 | Chamberlin et al. |
| 8,922,093 B2 | | 12/2014 | Crocker |
| 9,356,492 B2 | | 5/2016 | Chamberlin et al. |
| 9,525,325 B2 | | 12/2016 | Chamberlin |
| 9,641,051 B2 | | 5/2017 | Kalev |
| 9,917,486 B2 | | 3/2018 | Kirkley, Jr. et al. |
| 10,044,237 B2 | | 8/2018 | Woolmer et al. |
| 10,075,030 B2 | | 9/2018 | Klassen |
| 10,224,786 B2 | | 3/2019 | Woolmer et al. |
| 10,468,923 B2 | | 11/2019 | Heilman et al. |
| 2007/0013241 A1 | | 1/2007 | Schiferl et al. |
| 2008/0093850 A1 | | 4/2008 | Taneja et al. |
| 2012/0132473 A1 | | 5/2012 | Weber et al. |
| 2012/0161554 A1 | | 6/2012 | Ghelardi et al. |
| 2013/0049495 A1 | | 2/2013 | Matsuo |
| 2013/0187492 A1 | | 7/2013 | Woolmer |
| 2014/0009025 A1 | | 1/2014 | Hosek et al. |
| 2014/0015351 A1 | | 1/2014 | Marvin et al. |
| 2014/0091650 A1 | | 4/2014 | Lenschow |
| 2014/0300220 A1 | | 10/2014 | Marvin |
| 2014/0354089 A1 | | 12/2014 | Chamberlin et al. |
| 2014/0354090 A1 | | 12/2014 | Chamberlin |
| 2015/0030479 A1 | | 1/2015 | Müller |
| 2016/0164377 A1 | | 6/2016 | Gauthier et al. |
| 2016/0226327 A1 | | 8/2016 | Rippel et al. |
| 2016/0329765 A1 | | 11/2016 | Pal et al. |
| 2016/0329796 A1 | * | 11/2016 | Hano ..................... H02K 21/24 |
| 2017/0012480 A1 | | 1/2017 | Woolmer |
| 2017/0025927 A1 | | 1/2017 | Weerts et al. |
| 2017/0063182 A1 | | 3/2017 | Heilman et al. |
| 2018/0054094 A1 | | 2/2018 | Dlala et al. |
| 2018/0305036 A1 | | 10/2018 | Vondrell et al. |
| 2019/0181717 A1 | | 6/2019 | Zhou et al. |
| 2019/0288584 A1 | | 9/2019 | Vansompel et al. |
| 2019/0379257 A1 | | 12/2019 | Gerstler et al. |
| 2019/0383292 A1 | | 12/2019 | Kreidler et al. |
| 2020/0003215 A1 | | 1/2020 | Geue et al. |
| 2022/0393543 A1 | | 12/2022 | Goykhman et al. |
| 2022/0399791 A1 | | 12/2022 | Goykhman et al. |
| 2022/0416613 A1 | | 12/2022 | Goykhman et al. |
| 2023/0038386 A1 | | 2/2023 | Goykhman et al. |
| 2023/0082277 A1 | | 3/2023 | Goykhman et al. |

FOREIGN PATENT DOCUMENTS

| | | |
|---|---|---|
| CN | 109474114 A | 3/2019 |
| CN | 109478808 A | 3/2019 |
| CN | 112602254 | 4/2021 |
| DE | 101 40 362 A1 | 3/2003 |
| DE | 10 2014 221 648 A1 | 4/2016 |
| EP | 1 045 505 A2 | 10/2000 |
| EP | 2 109 208 A1 | 10/2009 |
| EP | 2 224 577 A1 | 9/2010 |
| EP | 3 028 888 A1 | 6/2016 |
| EP | 3 079 239 A1 | 10/2016 |
| EP | 3 460 958 A1 | 3/2019 |
| EP | 3 338 345 B1 | 6/2019 |
| GB | 974730 A | 11/1964 |
| GB | 2 538 526 A | 11/2016 |
| HU | 0103035 | 5/2002 |
| JP | S59126554 U | 8/1984 |
| JP | 2004-208461 A | 7/2004 |
| JP | 2006-14564 A | 1/2006 |
| JP | 2006-33965 A | 2/2006 |
| JP | 2006-50752 A | 2/2006 |
| JP | 4026496 | 12/2007 |
| JP | 2009-050066 A | 3/2009 |
| JP | 2013-121226 A | 6/2013 |
| KR | 2005/0007326 | 1/2005 |
| WO | 2009/025076 A1 | 2/2009 |
| WO | 2010/092403 A2 | 8/2010 |
| WO | 2018/015293 A1 | 1/2018 |
| WO | 2019/171318 A1 | 9/2019 |
| WO | 2021/089188 A1 | 5/2021 |
| WO | 2021/089189 A1 | 5/2021 |
| WO | 2021/115632 A1 | 6/2021 |

OTHER PUBLICATIONS

International Search Report and Written Opinion of the International Searching Authority for International Patent Application No. PCT/EP2020/025500 mailed Feb. 10, 2021, 12 pages.
International Search Report and Written Opinion of the International Searching Authority for International Patent Application No. PCT/EP2020/025570 mailed Apr. 9, 2021, 12 pages.
International Search Report and Written Opinion of the International Searching Authority for International Patent Application No. PCT/EP2021/025064 mailed May 20, 2021, 14 pages.
International Search Report and Written Opinion of the International Searching Authority for International Patent Application No. PCT/EP2021/025065 mailed May 27, 2021, 14 pages.
International Search Report and Written Opinion of the International Searching Authority for International Patent Application No. PCT/EP2021/025066 mailed May 27, 2021, 12 pages.
International Search Report and Written Opinion of the International Searching Authority for International Patent Application No. PCT/EP2021/025067 mailed May 28, 2021, 13 pages.
International Search Report and Written Opinion of the International Searching Authority for International Patent Application No. PCT/EP2020/025498 mailed Feb. 8, 2021, 15 pages.

* cited by examiner

FIG. 24
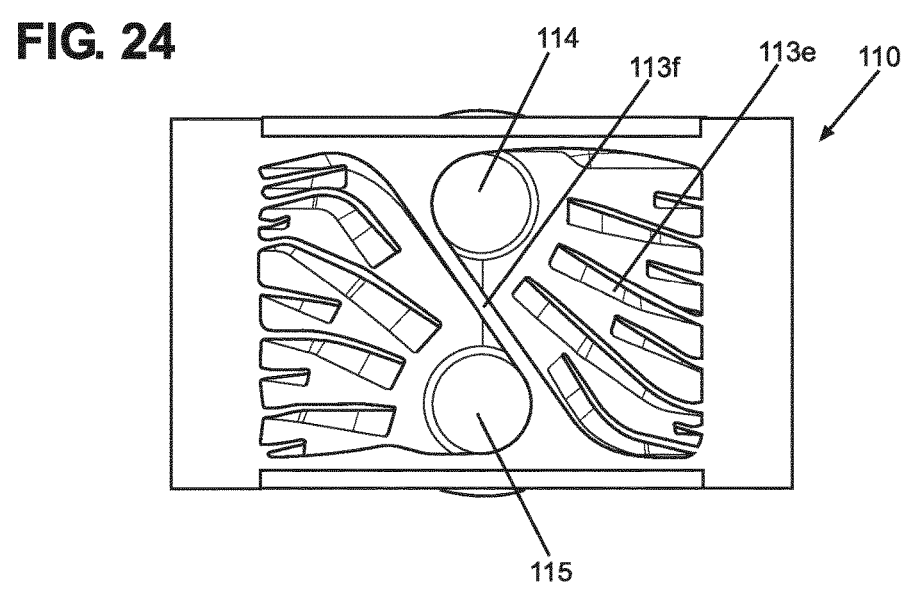
FIG. 25
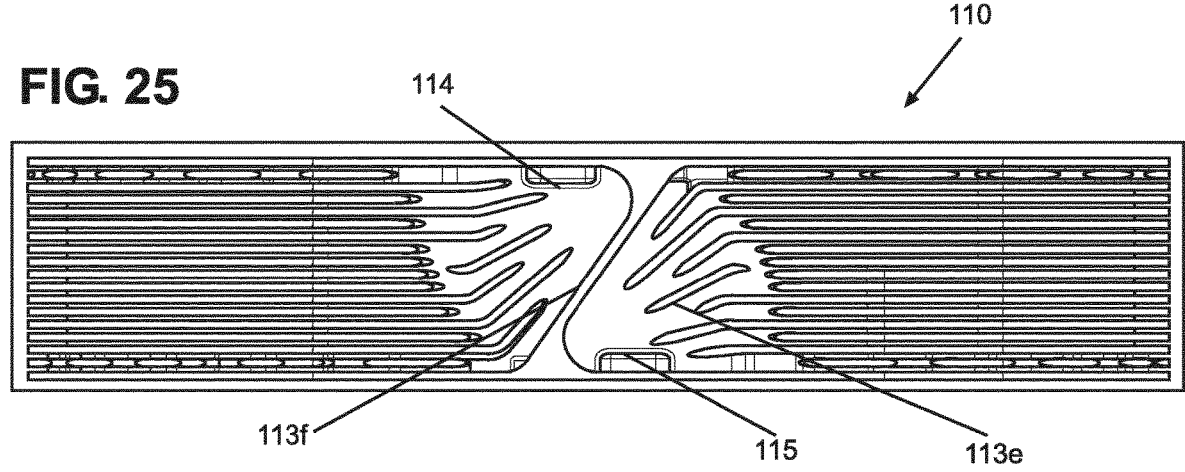
FIG. 26        FIG. 26A
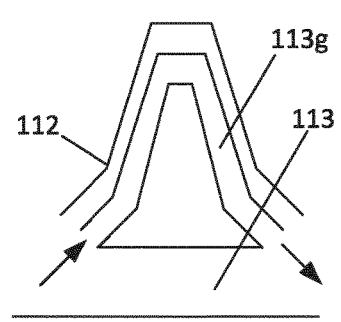

120

122b

122a

120

122b

122a

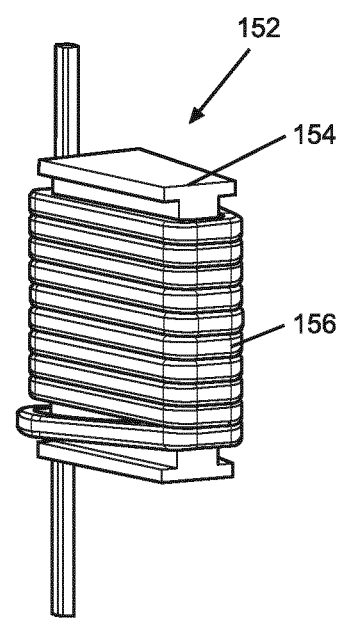
152
154
156
FIG. 41
152
154
156
FIG. 42
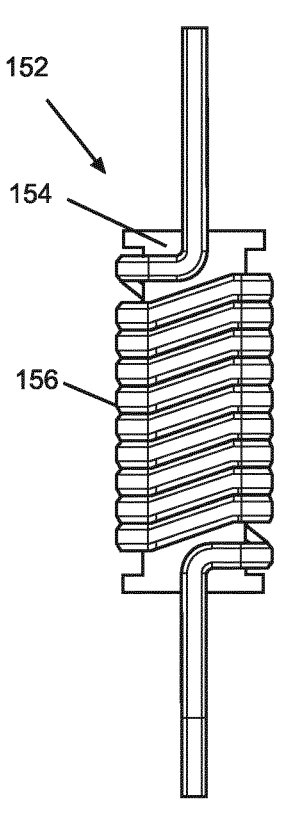
152
154
156
FIG. 43
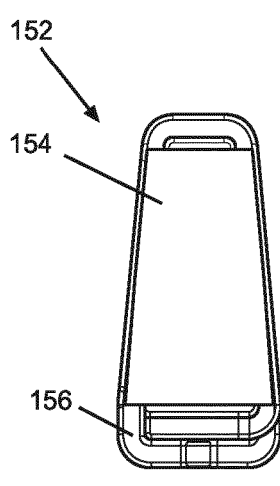
152
154
156
FIG. 44

AXIAL FLUX MOTOR WITH AIR COOLING SYSTEM

CROSS-REFERENCE TO RELATED APPLICATIONS

This application is a National Stage Application of PCT/EP2020/025498, filed on Nov. 6, 2020, which claims the benefit of U.S. Patent Application Ser. No. 62/931,702, filed on Nov. 6, 2019, and claims the benefit of U.S. Patent Application Ser. No. 62/931,707, filed on Nov. 6, 2019, and claims the benefit of U.S. Patent Application Ser. No. 62/931,712, filed on Nov. 6, 2019, the disclosures of which are incorporated herein by reference in their entireties. To the extent appropriate, a claim of priority is made to each of the above disclosed applications.

TECHNICAL FIELD

The present disclosure relates generally axial flux motors.

BACKGROUND

Electrically powered aircraft are increasingly becoming more relevant in the aerospace industry. The ability to optimize power density is an important factor relating to the successful widespread use of electrically powered aircraft. Heat extraction and loss reduction are significant considerations impacting the optimization of power density.

SUMMARY

Aspects of the present disclosure relate to an axial flux motor adapted to cool efficiently and reduce losses. The axial flux motor includes a shaft which is coupled to a first and second rotor. The rotors each include a series of circumferentially spaced permanent magnets. Additionally the axial flux motor comprises a stator assembly with a series of circumferentially spaced electromagnets.

Aspects of the present disclosure relate to configurations that use a cooling jacket to provide cooling of an axial flux motor. The cooling jacket can also contain a plurality of fins that project radially inward from a main circumferential wall of the cooling jacket. In some examples the cooling fins extend between electromagnets of a stator assembly of the motor.

Aspects of the present disclosure relate to integrating air-moving features into rotor carriers of devices such as axial flux motors to provide cooling. These air moving features allow the rotor to catch air and circulate the air through the axial flux motor which allows for cooling air to assist with heat extraction. The air moving features can move air through the electric device. The air moving features can include fins, holes, blades, scoops or other structures which are capable of generating air movements. In the case of an axial flux motor, air can be directed through the air gaps between the stator and the magnetic rotors of the motor.

A cause for losses in many axial flux motors is due to eddy currents. In order to reduce that loss some examples of the present axial flux motors with stator assemblies having stator cores with enlarged face plates In some examples this stator core is made from a plurality of laminate pieces which are stacked together along the cores axis. In some examples the laminations along with the I-shaped cross section assists in reducing slot harmonics which in turn reduces eddy current losses.

An axial flux electric motor can include a housing assembly arranged along a longitudinal axis and including a first housing part defining an internal cooling passageway through which a cooling fluid can be circulated between an inlet port and an outlet port; a stator assembly mounted within the housing assembly and in contact with the first housing part such that a thermally conductive pathway between the internal cooling passageway and the stator assembly is formed; and a rotor assembly mounted within the housing assembly, the rotor assembly being rotatable with respect to the stator assembly and including an output shaft extending out of the housing assembly.

In some examples, the internal cooling passageway is a circumferential passageway.

In some examples, the internal cooling passageway includes a plurality of internal ribs dividing the internal cooling passageway into a plurality of passageways.

In some examples, the plurality internal ribs extend at an oblique angle to the longitudinal axis of the motor.

In some examples, the plurality of internal ribs are parallel to each other along at least part of a total length of the internal ribs.

In some examples, the first housing part includes a plurality of cooling fins extending radially inward from an inner circumferential wall of the first housing part towards the longitudinal axis.

In some examples, the plurality of cooling fins extend at least partially into spaces defined between stator cores of the stator assembly.

In some examples, the plurality of cooling fins are integrally formed with the first housing part.

In some examples, the internal cooling passageway extends into the plurality of cooling fins.

In some examples, the plurality of cooling fins are at least partially hollow and form a portion of the internal cooling passageway.

In some examples, the plurality of internal ribs include bend portions proximate the inlet and outlet ports to direct fluid flow from and towards the inlet and outlet ports.

In some examples, the inlet and outlet ports extend through an outer circumferential wall of the first housing part.

In some examples, the inlet and outlet ports extend through axial ends of an outer circumferential wall of the first housing part.

In some examples, the inlet and outlet ports are aligned along a common axis that is parallel to the longitudinal axis.

In some examples, the motor further includes an internal dividing rib within the internal cooling passageway, the internal dividing rib dividing the internal cooling passageway into an inlet end proximate the inlet port and an outlet end proximate the outlet port.

In some examples, the first housing part is an additively manufactured component.

In some examples, the first housing part is formed from an aluminum material.

A cooling jacket for an axial flux motor can include a first housing part defining a circumferential internal cooling passageway through which a cooling fluid can be circulated between an inlet port and an outlet port, the first housing part having a circumferential inner wall surface and a circumferential outer wall surface.

In some examples, the internal cooling passageway includes a plurality of internal ribs dividing the internal cooling passageway into a plurality of passageways.

In some examples, the plurality internal ribs extend at an oblique angle to a longitudinal axis of the first housing part.

In some examples, the plurality of internal ribs are parallel to each other along at least part of a total length of the internal ribs.

In some examples, the first housing part includes a plurality of cooling fins extending radially inward from an inner circumferential wall of the first housing part towards the longitudinal axis.

In some examples, the plurality of cooling fins each define a base portion and a distal portion, the distal portion having a narrower dimension than the base portion.

In some examples, n the plurality of cooling fins are integrally formed with the first housing part.

In some examples, the internal cooling passageway extends into the plurality of cooling fins.

In some examples, the plurality of cooling fins are at least partially hollow and form a portion of the internal cooling passageway.

In some examples, the plurality of internal ribs include bend portions proximate the inlet and outlet ports to direct fluid flow from and towards the inlet and outlet ports.

In some examples, the inlet and outlet ports extend through the outer circumferential wall surface of the first housing part.

In some examples, the inlet and outlet ports extend through axial ends of the first housing part.

In some examples, the inlet and outlet ports are aligned along a common axis that is parallel to the longitudinal axis.

In some examples, the cooling jacket further includes an internal dividing rib within the internal cooling passageway, the internal dividing rib dividing the internal cooling passageway into an inlet end proximate the inlet port and an outlet end proximate the outlet port.

In some examples, the first housing part is an additively manufactured component.

In some examples, the first housing part is formed from an aluminum material.

An axial flux electric motor can include a motor shaft defining a longitudinal axis of rotation about which the motor shaft is rotatable; a stator assembly including a plurality of electromagnets spaced circumferentially about the axis of rotation, the electromagnets each including a stator core about which a wire coil is wound, the stator cores each including a core body which extends along a core axis between first and second opposite axial ends, the core axes being parallel to the axis of rotation, the first axial ends defining first end faces that face in a first axial direction and the second axial ends defining second end faces that face in a second axial direction opposite from the first axial direction, the wire coils being wound about the core axes between the first and second axial ends, wherein the first and second opposite axial ends of each stator core are adapted to define opposite magnetic poles of each corresponding electromagnet; a rotor assembly coupled to the motor shaft, the rotor assembly and the shaft being adapted to rotate together relative to the stator assembly about the longitudinal axis of rotation, the rotor assembly including a first rotor including a first rotor plate and a plurality of first permanent magnets carried by the first rotor plate, the first permanent magnets being circumferentially spaced about the axis of rotation and having first permanent magnet end faces positioned to oppose the first axial end faces of the stator cores, the first permanent magnet end faces being spaced from the first axial end faces of the stator cores by a first air gap, the rotor assembly also including a second rotor including a second rotor plate and a plurality of second permanent magnets carried by the second rotor plate, the second permanent magnets being circumferentially spaced about the axis of rotation and having second permanent magnet end faces positioned to oppose the second axial end faces of the stator cores, the second permanent magnet end faces being spaced from the second axial end faces of the stator cores by a second air gap; and a motor housing enclosing the stator assembly, the first rotor assembly and the second rotor assembly, the motor housing including a circumferential wall that circumferentially surrounds the stator assembly, the circumferential wall including a cooling jacket that surrounds the stator assembly and defines an internal cooling passage for allowing cooling fluid to be pumped through an interior of the circumferential wall, and the motor housing also including a plurality of cooling fins that project radially inwardly from the circumferential wall into regions circumferentially between the electromagnets.

In some examples, the cooling fluid is a cooling liquid.

In some examples, the cooling passage extends circumferentially about the axis of rotation, and wherein inlet and outlet ports are provided at opposite ends of the cooling passage for pumping the cooling fluid through the cooling passage.

In some examples, the cooling fins define radial lengths, and wherein the cooling fins that are tapered such that widths of the cooling fins gradually reduce in size as the cooling fins extend along their radial lengths toward the axis of rotation.

In some examples, the cooling fins taper along a majority of their radial lengths.

In some examples, the cooling fins include base ends integral with the circumferential wall and free ends spaced radially inwardly with respect to the base ends, and wherein the cooling fins have widths that taper inwardly was the cooling fins extends from the base ends to the free ends.

In some examples, the cooling fluid from the cooling passage also flows though the cooling fins.

In some examples, the cooling jacket has an inner diameter and an outer diameter, and wherein the cooling fins have radial lengths that are less than 20 percent as long as the inner diameter.

In some examples, the stator assembly has an axial dimension, and wherein the cooling fins have axial dimensions that are less than 50 percent as long as the axial dimension of the stator assembly.

An axial flux electric motor can include a housing assembly arranged along a longitudinal axis; a stator assembly mounted within the housing assembly, the stator assembly including a plurality of stator cores with wire coils, the stator assembly defining first and second axial faces; and a rotor assembly mounted within the housing assembly, the rotor assembly being rotatable with respect to the stator assembly and including an output shaft extending out of the housing assembly, the rotor assembly including a first rotor part carrying a first plurality of permanent magnets facing and spaced from the stator assembly first axial end to define a first air gap, the first rotor part including a first air-movement feature configured to, when the first rotor part is rotating, draw air into the housing assembly and through the first air gap.

In some examples, the housing assembly includes one or more air outlets in fluid communication with the first air gap and being configured to exhaust air flowing through the first air gap.

In some examples, the housing assembly includes one or more air inlets in fluid communication with the first rotor part.

In some examples, the one or more air inlets are radially closer to the longitudinal axis in comparison to the one or more air outlets.

In some examples, the first air movement feature includes a plurality of openings defined within the first rotor part.

In some examples, n the plurality of openings are oriented at an oblique angle to the longitudinal axis.

In some examples, the first plurality of openings are defined as cylindrical openings.

In some examples, the motor further includes a second rotor part carrying a second plurality of permanent magnets facing and spaced from the stator assembly second axial face to define a second air gap, the second rotor part including a second air-movement feature configured to, when the second rotor part is rotating, draw air into the housing assembly and through the first air gap.

In some examples, second the air movement feature includes a plurality of second openings defined within the first rotor part.

In some examples, the second plurality of openings are oriented at an oblique angle to the longitudinal axis.

In some examples, the second plurality of openings are defined as cylindrical openings.

An axial flux electric motor can include a motor shaft defining a longitudinal axis of rotation about which the motor shaft is rotatable; a stator assembly including a plurality of electromagnets spaced circumferentially about the axis of rotation, the electromagnets each including a stator core about which a wire coil is wound, the stator cores each including a core body which extends along a core axis between first and second opposite axial ends, the core axes being parallel to the axis of rotation, the first axial ends defining first end faces that face in a first axial direction and the second axial ends defining second end faces that face in a second axial direction opposite from the first axial direction, the wire coils being wound about the core axes between the first and second axial ends, wherein the first and second opposite axial ends of each stator core are adapted to define opposite magnetic poles of each corresponding electromagnet; a rotor assembly coupled to the motor shaft, the rotor assembly and the shaft being adapted to rotate together relative to the stator assembly about the longitudinal axis of rotation, the rotor assembly including a first rotor including first rotor plate and a plurality of first permanent magnets carried by the first rotor plate, the first permanent magnets being circumferentially spaced about the axis of rotation and having first permanent magnet end faces positioned to oppose the first axial end faces of the stator cores, the first permanent magnet end faces being spaced from the first axial end faces of the stator cores by a first air gap, the rotor assembly also including a second rotor including second rotor plate and a plurality of second permanent magnets carried by the second rotor plate, the second permanent magnets being circumferentially spaced about the axis of rotation and having second permanent magnet end faces positioned to oppose the second axial end faces of the stator cores, the second permanent magnet end faces being spaced from the second axial end faces of the stator cores by a second air gap; and the first and second rotor plates being configured for moving cooling air through the first and second air gaps.

In some examples, the cooling air moves through the air gaps in an outward radial direction relative to the axis of rotation.

In some examples, the cooling air moves through the air gaps in a direction from inner diameters toward outer diameters of the first and second rotor plates.

In some examples, the motor includes a motor housing enclosing the stator assembly and the rotor assembly, wherein the cooling air is drawn into the motor housing by the rotor plates in an axial orientation, and is forced out of the motor housing by the rotor plates in a radial orientation.

In some examples, the motor housing includes a circumferential wall that surrounds the stator assembly, a first axial end wall that covers the first rotor plate and a second axial end wall that covers the second rotor plate, wherein air inlet openings for allowing the cooling air to be drawn into the motor housing are defined through the first and second end walls and air outlet openings for exhausting the cooling air from the motor housing are defined by the circumferential wall.

In some examples, the circumferential wall includes an integrated cooling jacket defining a cooling passage through which cooling fluid is pumped.

In some examples, the cooling fluid is a cooling liquid, wherein the cooling passage is defined within the circumferential wall, and wherein the cooling passage extends circumferentially about the axis of rotation.

In some examples, the motor includes inlet and outlet ports for pumping the cooling fluid circumferentially through the cooling passage.

In some examples, the motor includes radial cooling fins that project radially inwardly from the circumferential wall into space between the electromagnets of the stator assembly.

In some examples, the first rotor plate includes a first air-moving feature for moving the cooling air through the first air gap and the second rotor plate includes a second air-moving feature for moving the cooling air through the second air gap.

In some examples, the first and second air-moving features are selected from the group including holes, blades, scoops, and fins.

In some examples, the first and second air-moving features include a plurality of openings defined through the rotor plates at an oblique angle relative to the axial orientation.

In some examples, the openings of the first rotor plate are arranged along a circle that surrounds the axis of rotation and the openings of the second rotor plate are arranged along a circle that surrounds the axis of rotation.

In some examples, the openings are closer to inner diameters of the first and second rotor plates than outer diameters of the first and second rotor plates.

In some examples, the openings are defined through truncated conical walls of the first and second rotor plates.

In some examples, the first and second rotors include first and second central hub portions respectively integrated with the first and second rotor plates, the first and second central hub portions being fastened together to define a hub of the rotor assembly, and wherein a rotational bearing is mounted between the hub and an inner sleeve of the stator assembly.

An axial flux electric motor can include a housing assembly arranged along a longitudinal axis; a stator assembly mounted within the housing assembly, the stator assembly including a plurality of stator cores with wire coils, the stator assembly defining first and second axial faces, wherein each of the plurality of stator cores has an I-shaped cross-sectional shape in an axial direction parallel to the longitudinal axis; and a rotor assembly mounted within the housing assembly, the rotor assembly being rotatable with respect to the stator assembly and including an output shaft extending out of the housing assembly, the rotor assembly including a first rotor part carrying a first plurality of permanent magnets facing and spaced from the stator assembly first axial end.

In some examples, each of the plurality of stator cores is formed by a plurality of stacked plates.

In some examples, each of the plurality of stacked plates defines an I-shaped outer perimeter.

In some examples, each of the plurality of stator cores defines a core body extending between a first end face and a second end face, the first and second end faces having a larger dimension than the core body to form overhanging portions.

In some examples, the each of the plurality of core bodies has a trapezoidal cross-sectional shape in a direction orthogonal to the longitudinal axis.

In some examples, each of the core body, the first end face, and the second end face, each define a trapezoidal outer perimeter shape.

In some examples, wherein, for each of the plurality of stator cores, the wire coil is wrapped about the stator core body between the first and second end faces.

An axial flux electric motor can include a motor shaft defining a longitudinal axis of rotation about which the motor shaft is rotatable; a stator assembly including a plurality of electromagnets spaced circumferentially about the axis of rotation, the electromagnets each including a stator core about which a wire coil is wound, the stator cores each including a core body which extends along a core axis between first and second opposite axial ends, the core axes being parallel to the axis of rotation, the first axial ends defining first end faces that face in a first axial direction and the second axial ends defining second end faces that face in a second axial direction opposite from the first axial direction, the wire coils being wound about the core axes between the first and second axial ends, wherein the first and second opposite axial ends of each stator core are adapted to define opposite magnetic poles of each corresponding electromagnet; a rotor assembly coupled to the motor shaft, the rotor assembly and the shaft being adapted to rotate together relative to the stator assembly about the longitudinal axis of rotation, the rotor assembly including first rotor including a first rotor plate and a plurality of first permanent magnets carried by the first rotor plate, the first permanent magnets being circumferentially spaced about the axis of rotation and having first permanent magnet end faces positioned to oppose the first axial end faces of the stator cores, the first permanent magnet end faces being spaced from the first axial end faces of the stator cores by a first air gap, the rotor assembly also including a second rotor including a second rotor plate and a plurality of second permanent magnets carried by the second rotor plate, the second permanent magnets being circumferentially spaced about the axis of rotation and having second permanent magnet end faces positioned to oppose the second axial end faces of the stator cores, the second permanent magnet end faces being spaced from the second axial end faces of the stator cores by a second air gap; and the stator cores including enlarged first and second faceplates at the first and second axial ends which define the first and second axial end faces.

In some examples, the first and second faceplates project outwardly from the core bodies at the first and second axial ends.

In some examples, the wire coils are wound between the first and second faceplates.

In some examples, the stator cores each have an I-shaped cross-section taken along a cross-section line perpendicular with respect to the core axis.

In some examples, the stator cores are each defined by a plurality of laminate pieces stacked together along the core axes, the laminate pieces each having an I-shaped cross-section taken along a cross-section line perpendicular with respect to the core axis.

In some examples, the laminate pieces have I-shaped profiles that are progressively larger as the laminate pieces are stacked along the core axes.

A stator core for a stator assembly of an axial flux electric motor can include a first end face; a second end face; and a core body extending between the first and second end faces along a longitudinal axis; wherein the first and second end faces extend orthogonally to the longitudinal axis and wherein the stator core has an I-shaped cross-sectional profile.

In some examples, each of the plurality of stacked plates defines an I-shaped outer perimeter.

In some examples, the stator core is formed by a plurality of stacked plates.

In some examples, the stator core has a trapezoidal cross-sectional shape in a direction orthogonal to the longitudinal axis.

In some examples, each of the core body, the first end face, and the second end face, each define a trapezoidal outer perimeter shape.

In some examples, some of the stacked plates have a larger surface area than others of the stacked plates.

In some examples, the stator core is formed from a cobalt steel material.

A variety of additional aspects will be set forth in the description that follows. the aspects relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 24 is cross-sectional side view of a third portion of the first housing part of FIG. 14.

FIG. 25 is cross-sectional flattened side view of the internal cooling passageway of the first housing part of FIG. 14.

FIG. 26 is a schematic cross-sectional end view of an alternative aspect of the internal cooling passageway for the first housing part of FIG. 14.

FIG. 26A is a schematic cross-sectional end view of an alternative aspect of the internal cooling passageway for the first housing part of FIG. 14.

FIG. 41 is a perspective view of a single stator core and wire coiling of a stator assembly of the axial flux motor of FIG. 1.

FIG. 42 is a first side view of the stator core and wire coiling of FIG. 41.

FIG. 43 is a second side view of the stator core and wire coiling of FIG. 41.

FIG. 44 is an end view of the stator core and wire coiling of FIG. 41.

DETAILED DESCRIPTION

Figure 1:
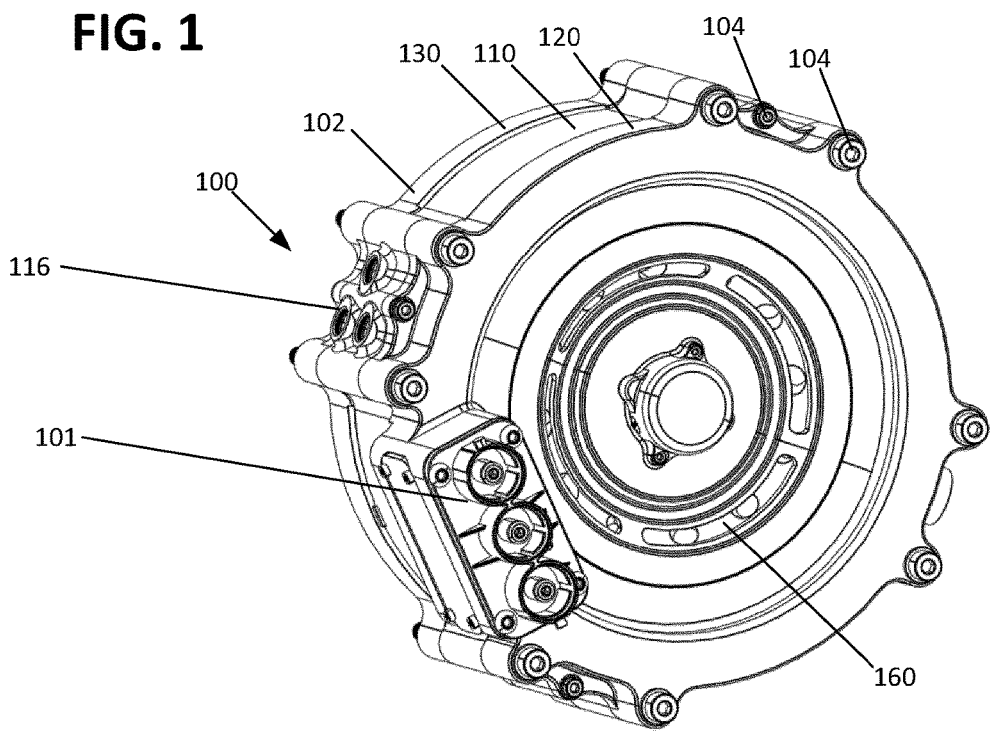
FIG. 1 is a first perspective view of an example axial flux motor in accordance with the present disclosure.
Figure 2:
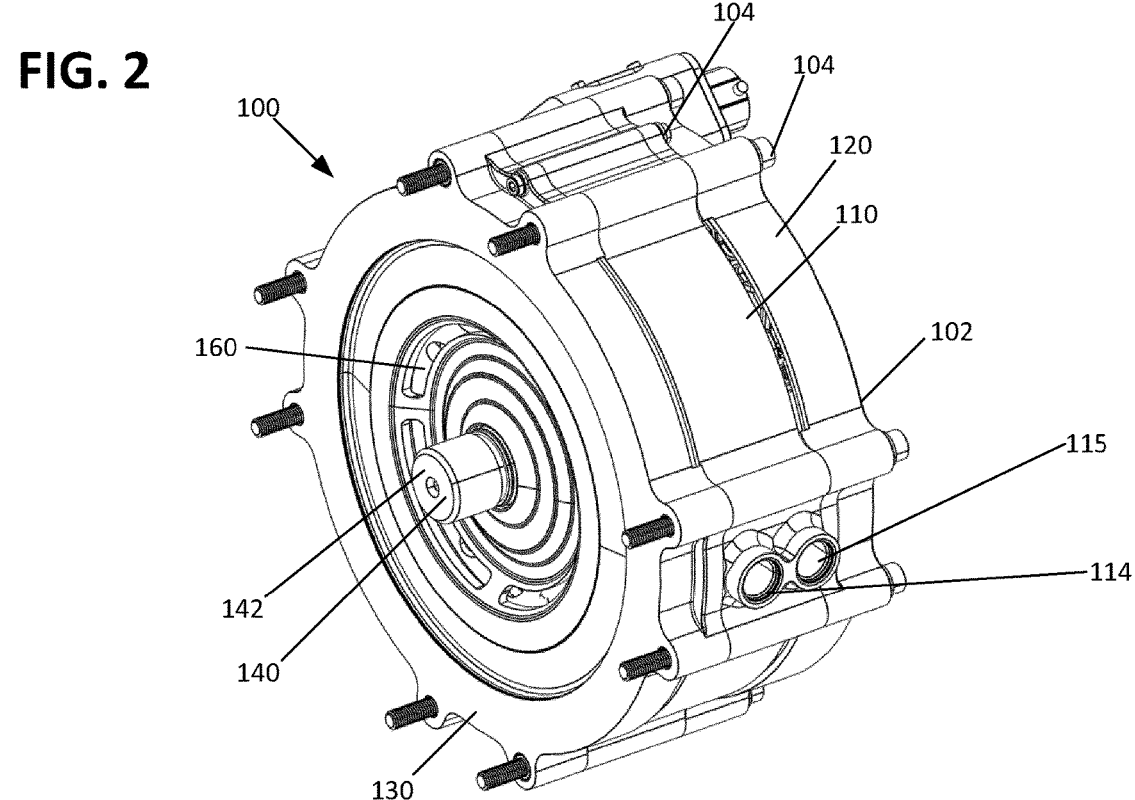
FIG. 2 is a second perspective view of the axial flux motor of FIG. 1.
Figure 3:
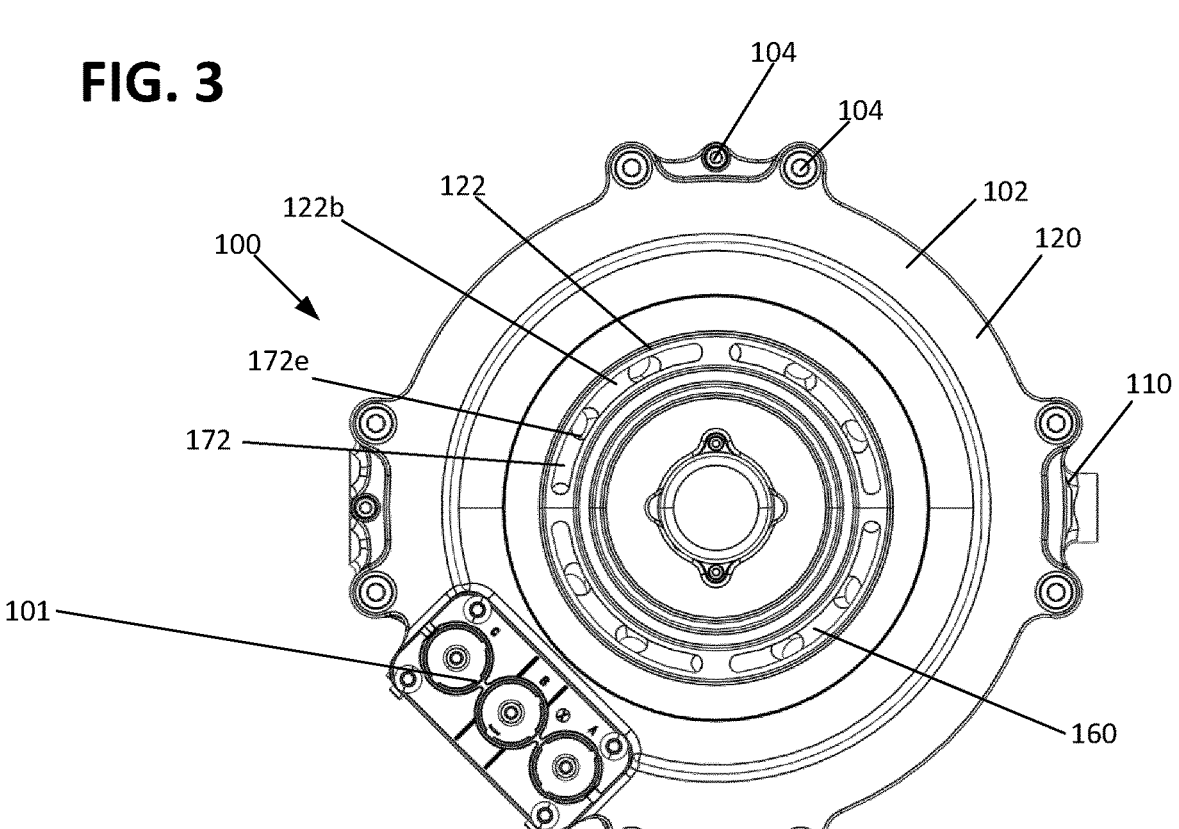
FIG. 3 is a first end view of the axial flux motor of FIG. 1.
Figure 4:
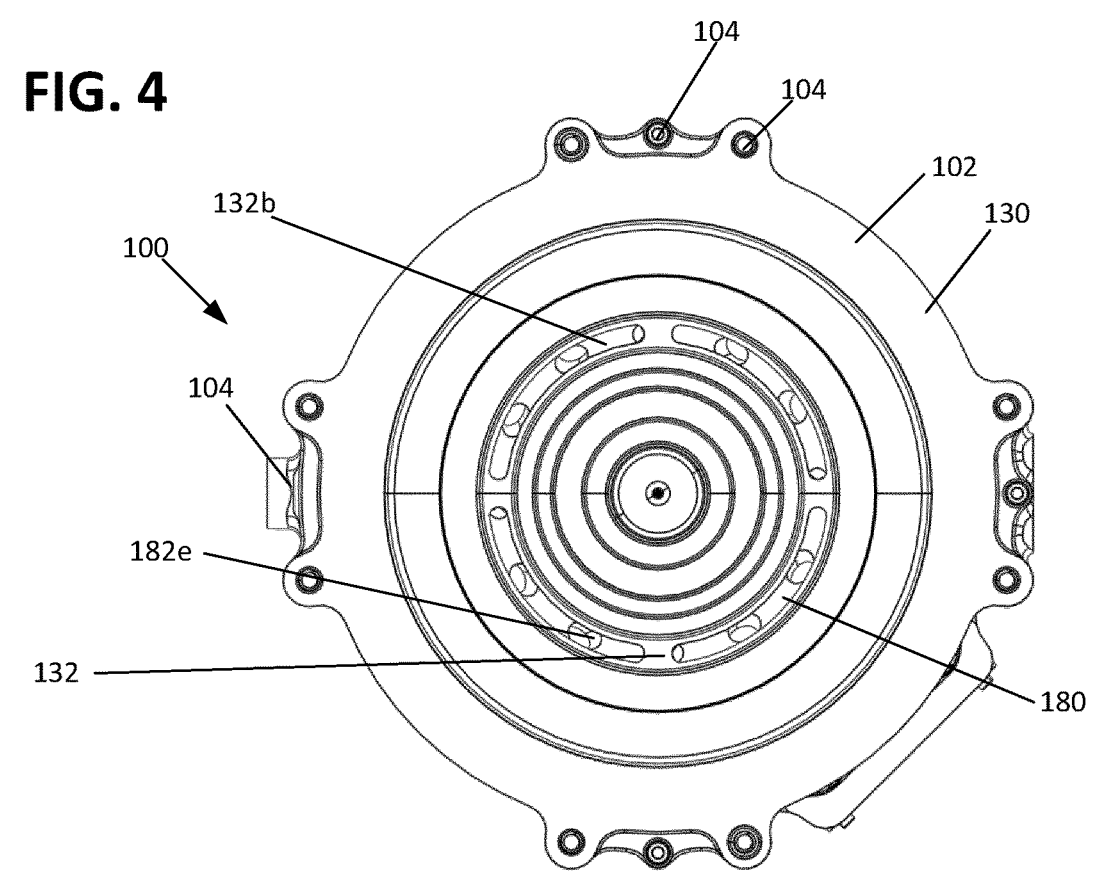
FIG. 4 is a second end view of the axial flux motor of FIG. 1.
Figure 5:
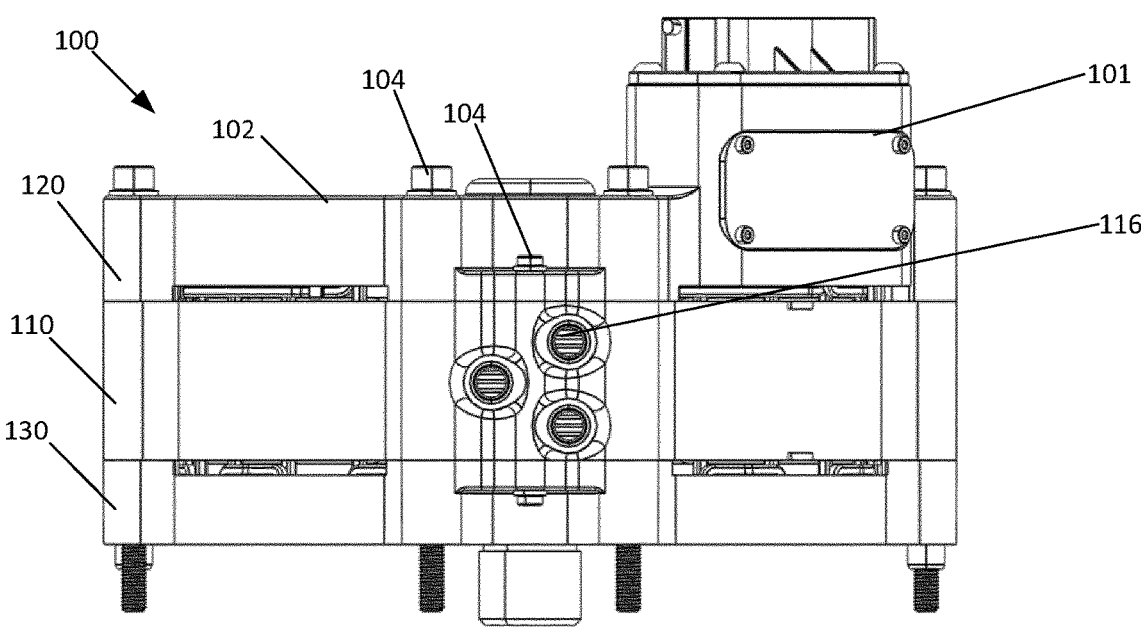
FIG. 5 is a first side view of the axial flux motor of FIG. 1.
Figure 6:
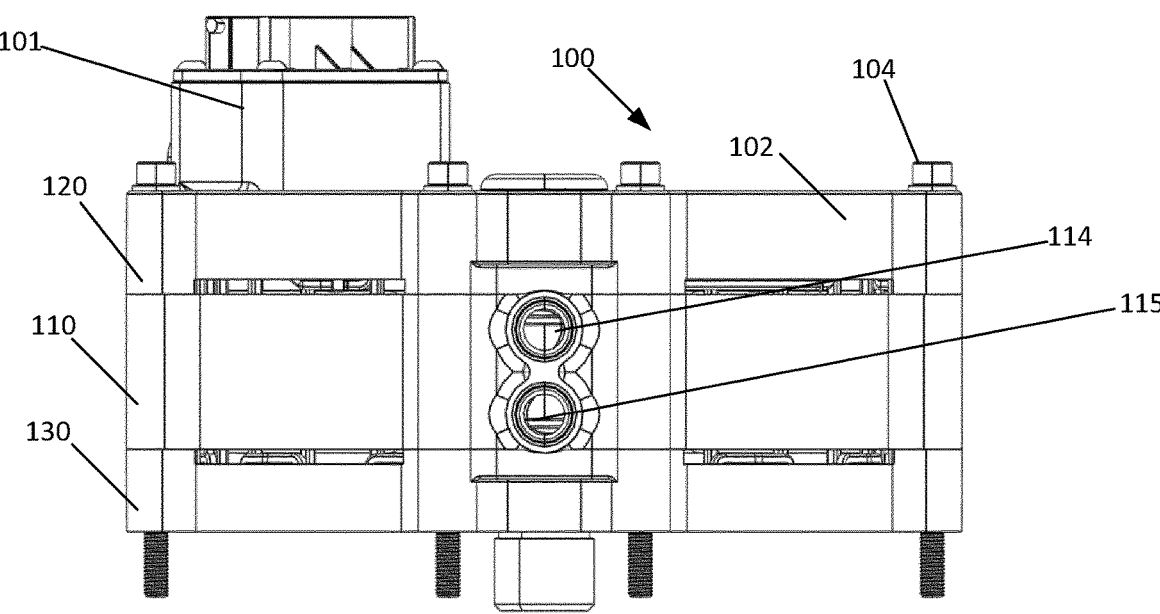
FIG. 6 is a second side view of the axial flux motor of FIG. 1.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several figures.

General Construction

FIGS. 1 to 11 show an axial flux electric motor 100 in accordance with the principles of the present disclosure. In one aspect, the motor 100 includes a housing assembly 102 for housing the stator assembly 150 and the rotor assembly 160 of the motor 100. The motor 100 is oriented about a longitudinal axis X.

As shown, the housing assembly 102 includes a first housing part 110, a second housing part 120, and a third housing part 130 cooperatively define the housing assembly 102. Fasteners 104, for example threaded bolts or screws, are provided to secure the housing parts 110, 120, 130 together. Although the drawings do not show retainers or nuts provided in association with the fasteners 104, a skilled person will understand that one or both of the housing parts 120, 130 can be provided with correspondingly threaded openings and/or that separate retainers, such as nuts, can be provided. The first housing part 110 is shown in isolation at FIGS. 14 to 26a. The second housing part 120 is shown in isolation at FIGS. 27 to 31. The third housing part 130 is shown in isolation at FIGS. 32 to 36. The first housing part 110 supports the stator assembly 150 while the second housing part 120 encloses one side of the rotor assembly 160 with the third housing part 130 enclosing an opposite side of the rotor assembly 160. In one aspect the second and third housing parts 120, 130 include end walls 122, 132 defining central apertures 122a, 132a and a plurality of air intake apertures 122b, 132b arranged as arc-shaped segments circumferentially arranged about the central apertures 122a, 132a. The second and third housing parts 120, 130 are further provided with circumferential outer walls 124, 134. In one aspect, the circumferential outer walls 124, 134 include notches or openings 124a, 134a that enable airflow into and out of the housing assembly 102. In the example presented herein, the notches or openings 124a, 134a form an enclosed opening with an end portion of the first housing part 110. However, alternate arrangements are possible. For example, enclosed openings could be wholly formed in the second and third housing parts 120, 130. Various features of the housing parts 110, 120, 130 are discussed in further detail in later sections.

The stator assembly 150, shown in FIGS. 7 to 10 and 12 to 13 includes a plurality of electromagnets 152 spaced circumferentially about the axis of rotation X. The electromagnets 152 each include a stator core 154 about which a wire coil 156 (e.g., a copper winding) is wound. FIGS. 41 to 44 show an individual stator core 154 and coil 156 while FIGS. 45 to 49 show an individual stator core 154 in isolation, the features of which are discussed in a later section. In operation, electromagnets define opposite magnetic poles at the ends of the stator cores 154 when an electrical current is applied to the wire coils 156 via power connection interface 101. In one aspect, the stator assembly 150 can be provided with a stator assembly body 158 securing the components of the stator assembly 150 together. In the example shown, the stator body 158 can be an epoxy or potting material applied after the stator assembly 150 is mounted within the first housing part 154 and the bearing assembly sleeve 192 such that the stator assembly 150 is in direct thermal contact with the housing part 120. In one aspect, the stator body 158 supports the sleeve 192 of the bearing assembly 190. In some examples, the material of the stator body 158 has a high coefficient of thermal conductivity such that heat can be transferred from the stator assembly 150 to the housing part 120. For example, the stator body 158 can be formed form a thermally conductive epoxy material or thermoplastic material. Although not actually formed as a separate or independent body, the stator body 158 is shown in isolation at FIG. 12 such that various resulting features of the stator body 158 can be more readily viewed. The stator assembly 150 can also be provided with end rings 159a, 159b bridging between the sleeve 192 and the first housing part 120 to secure the axial ends of the stator body 158 and to impart structural integrity to the stator assembly 150.

Figure 7:
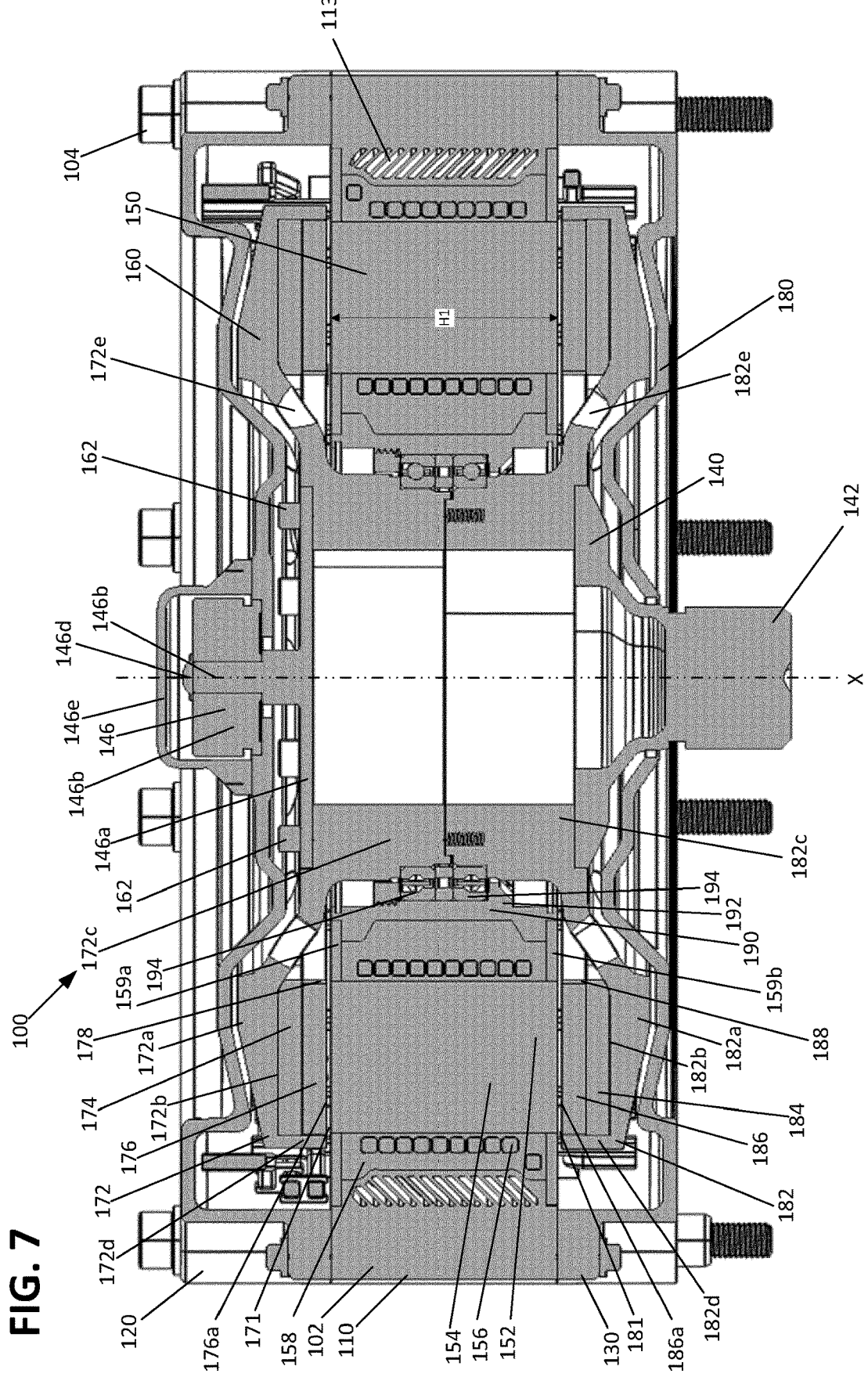
FIG. 7 is a cross-sectional side view of the axial flux motor of FIG. 1.
Figure 8:
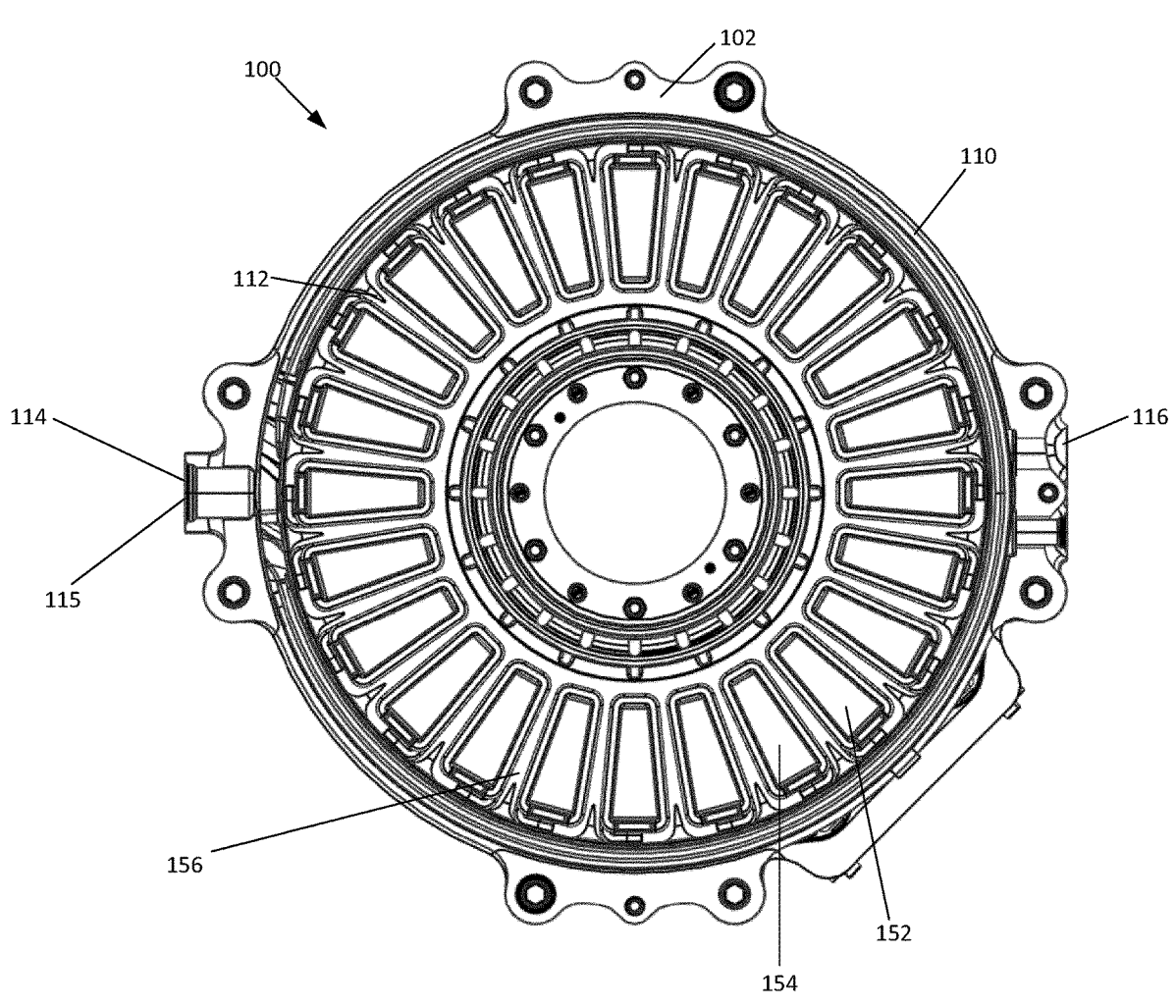
FIG. 8 is a cross-sectional end view of the axial flux motor of FIG. 1.
Figures 9, 10:
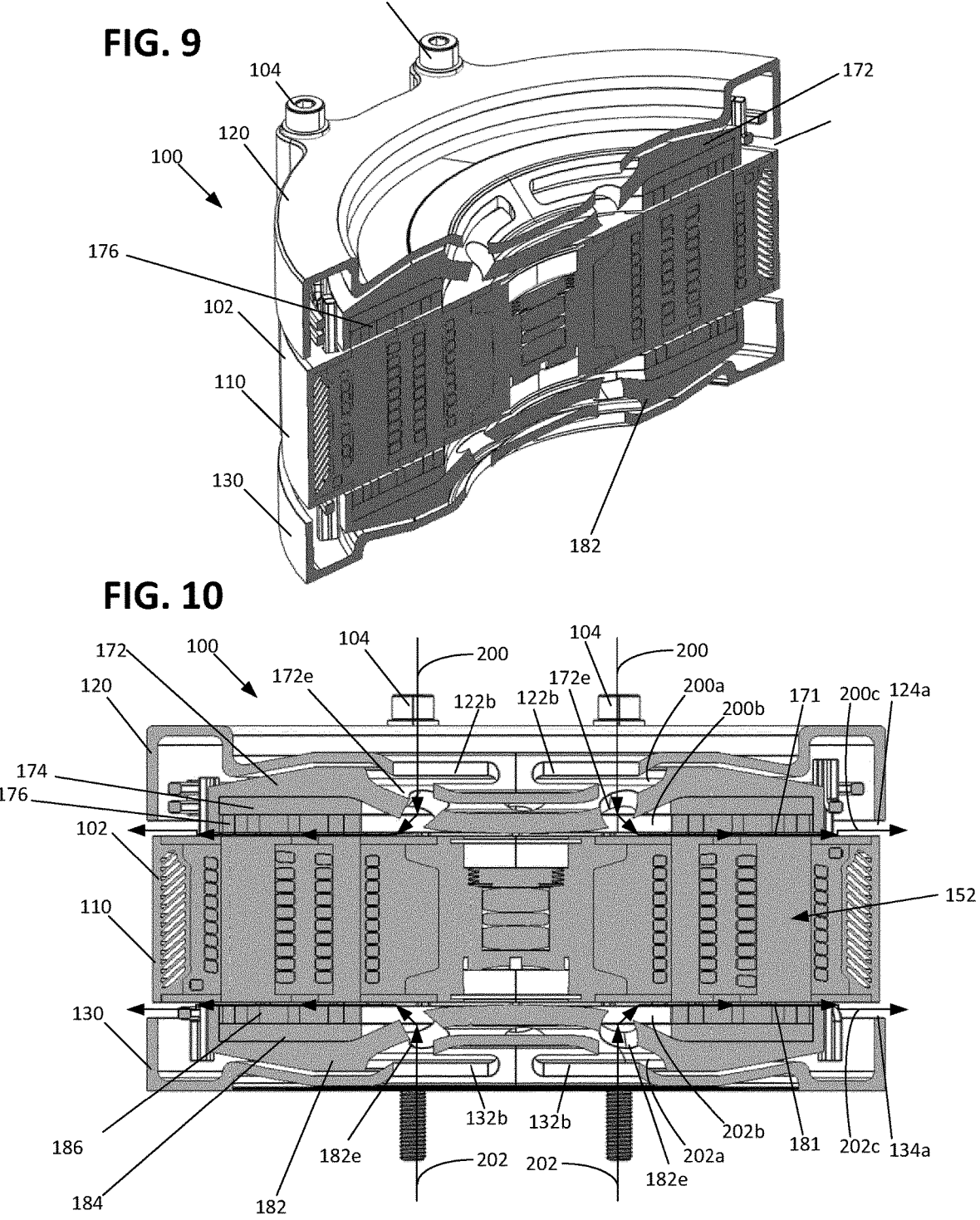
FIG. 9 is a cross-sectional side perspective view of the axial flux motor of FIG. 1.
FIG. 10 is a cross-sectional view of the axial flux motor of FIG. 1.
Figure 11:
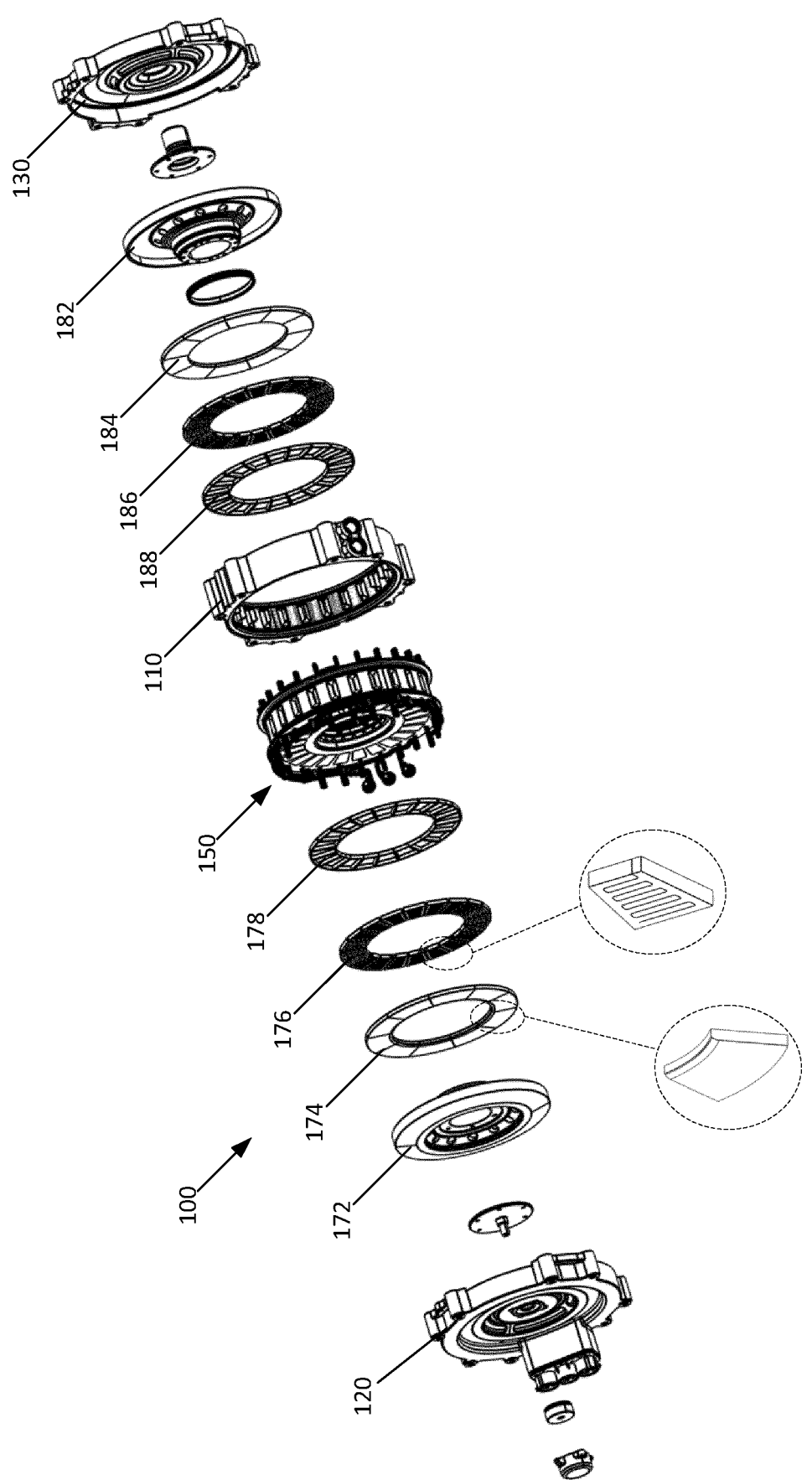
FIG. 11 is a perspective exploded view of the axial flux motor of FIG. 1.
Figure 12:
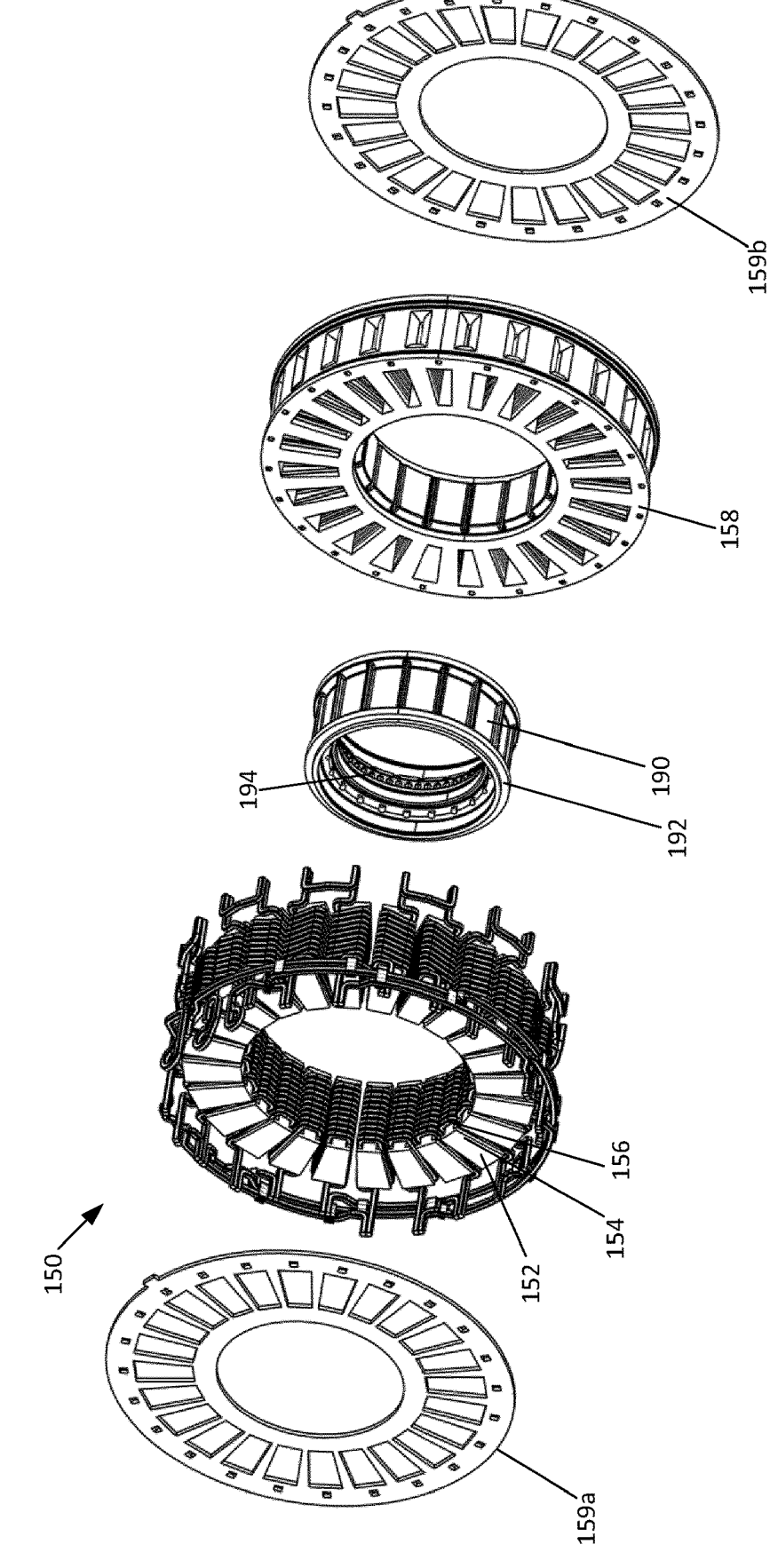
FIG. 12 is a perspective exploded view of a portion of the axial flux motor of FIG. 1.
Figure 13:
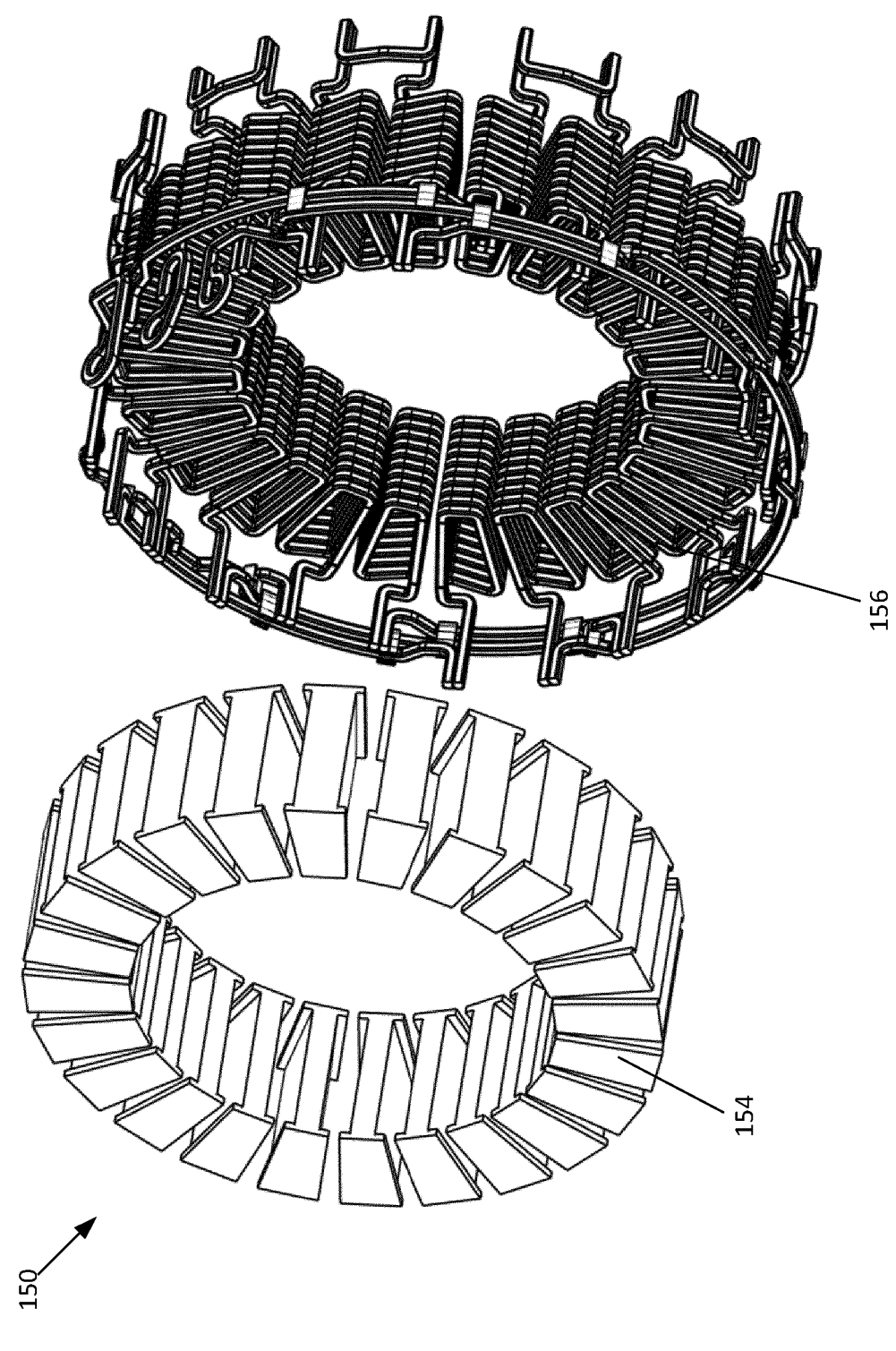
FIG. 13 is a perspective exploded view of a portion of the axial flux motor of FIG. 1.
Figure 14:
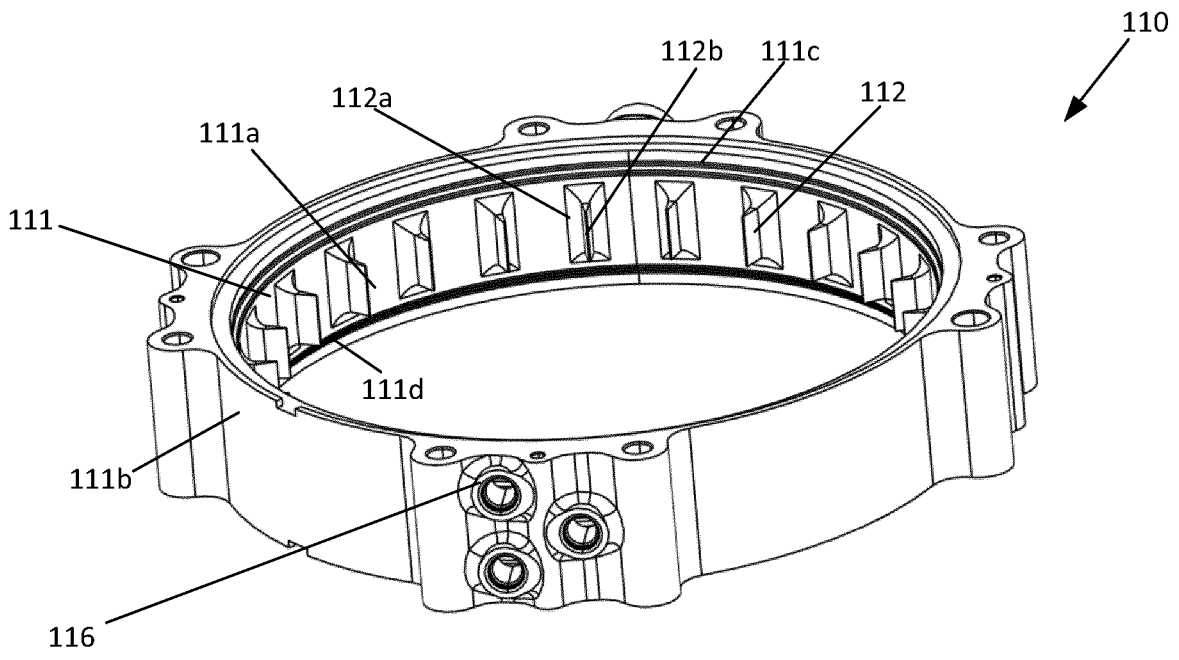
FIG. 14 is a first perspective view of a first housing part of the axial flux motor of FIG. 1, the first housing part including a cooling jacket.
Figure 15:
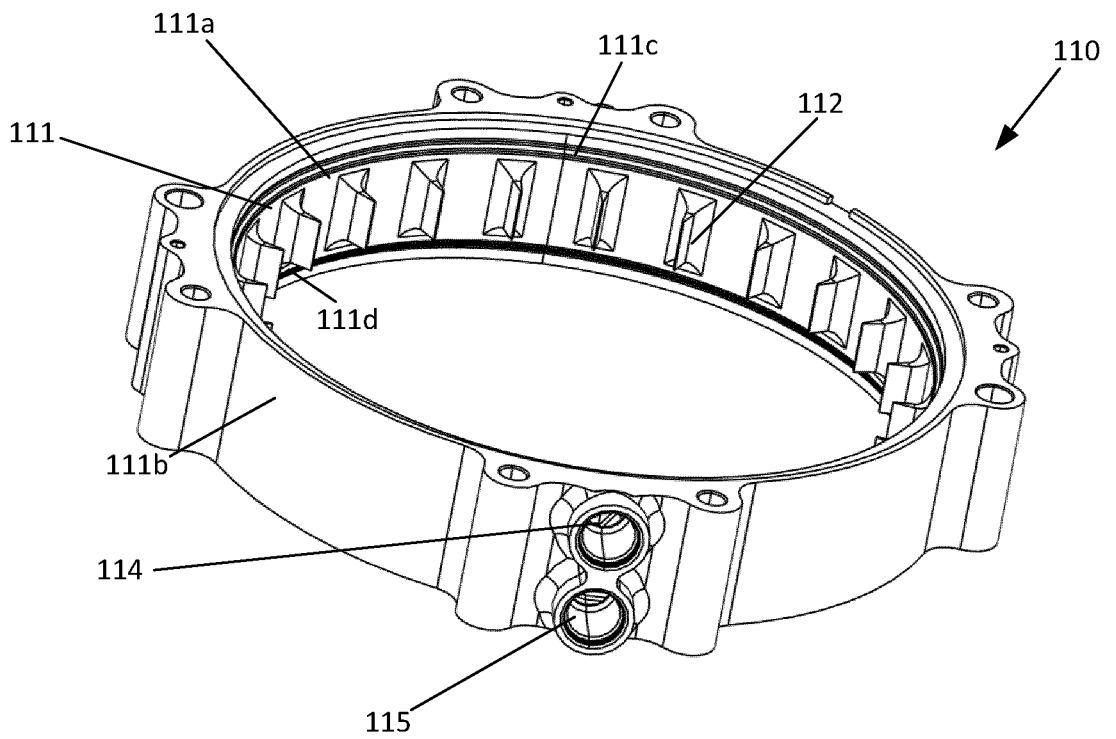
FIG. 15 is a second perspective view of the first housing part of FIG. 14.
Figure 16:
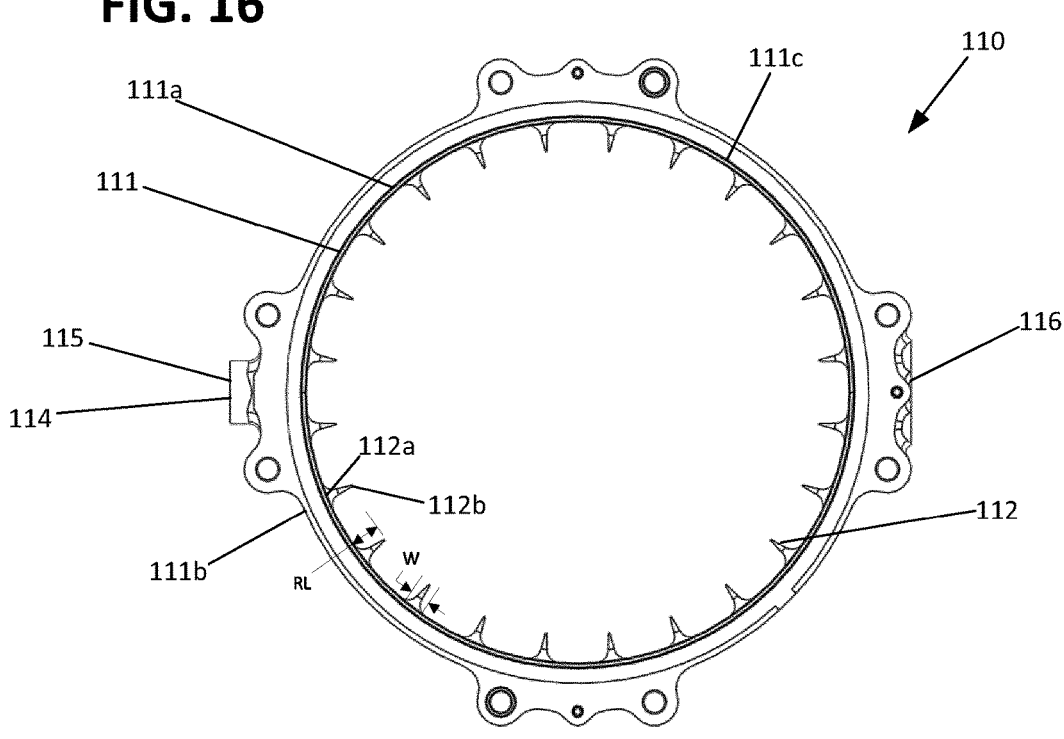
FIG. 16 is a first end view of the first housing part of FIG. 14.
Figure 17:
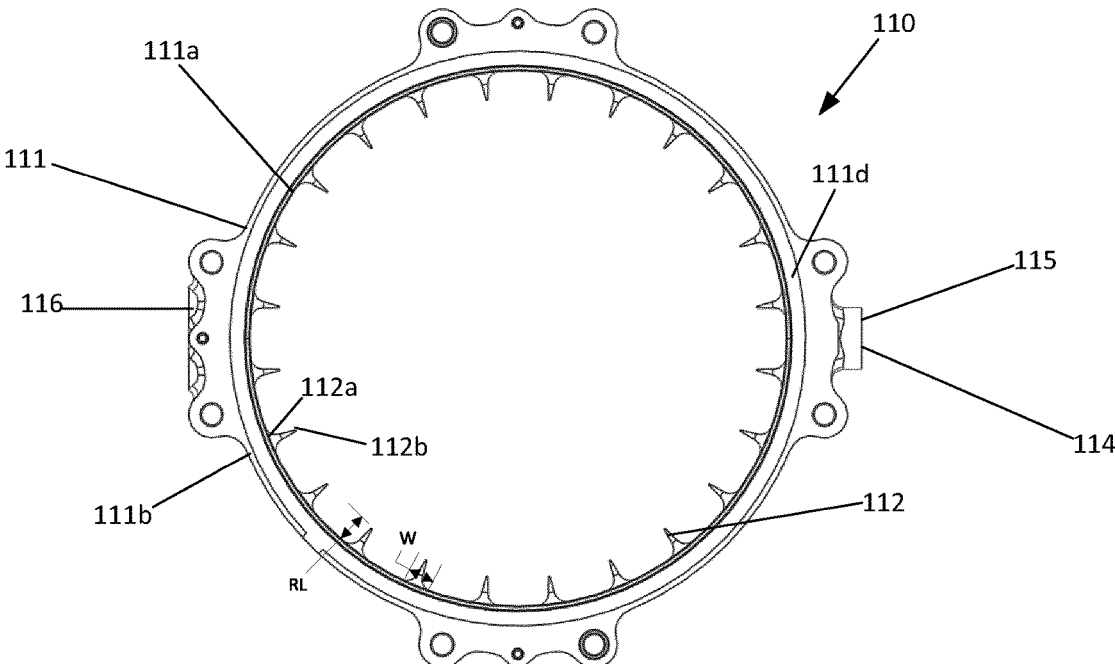
FIG. 17 is a second view of the first housing part of FIG. 14.
Figure 18:
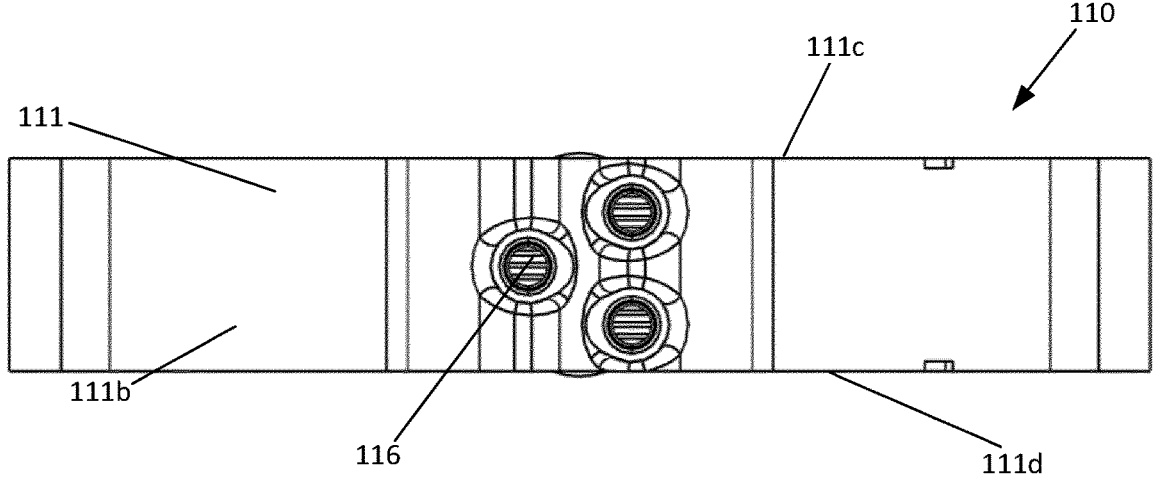
FIG. 18 is a first side view of the first housing part of FIG. 14.
Figure 19:
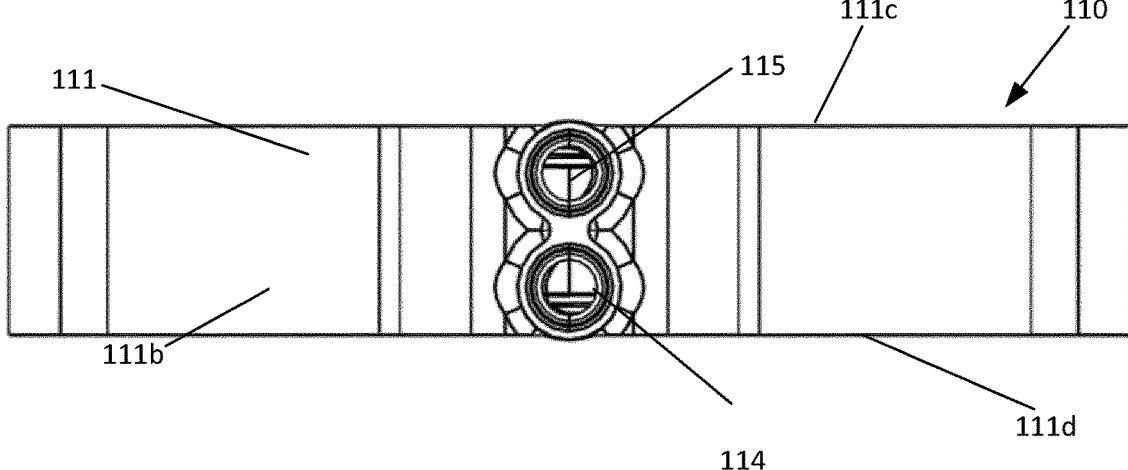
FIG. 19 is a second side view of the first housing part of FIG. 14.
Figure 20:
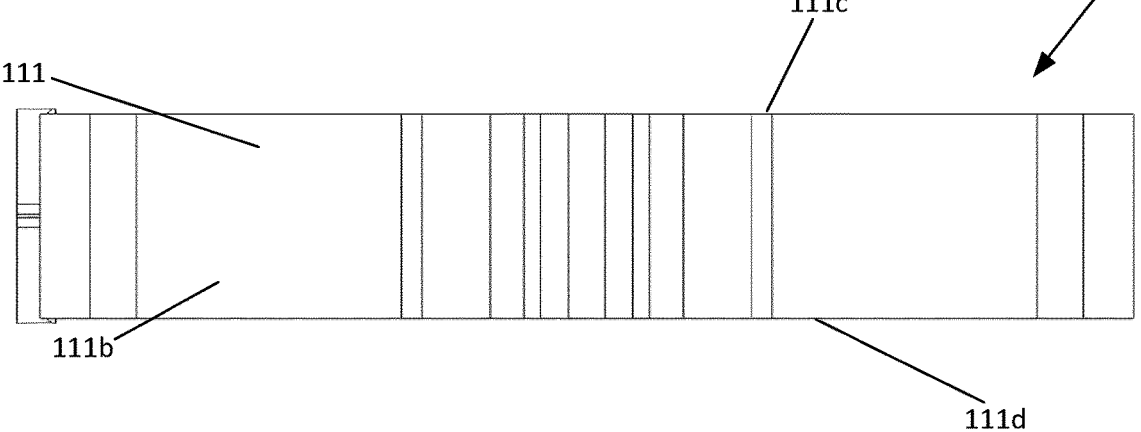
FIG. 20 is a third side view of the first housing part of FIG. 14.
Figure 21:
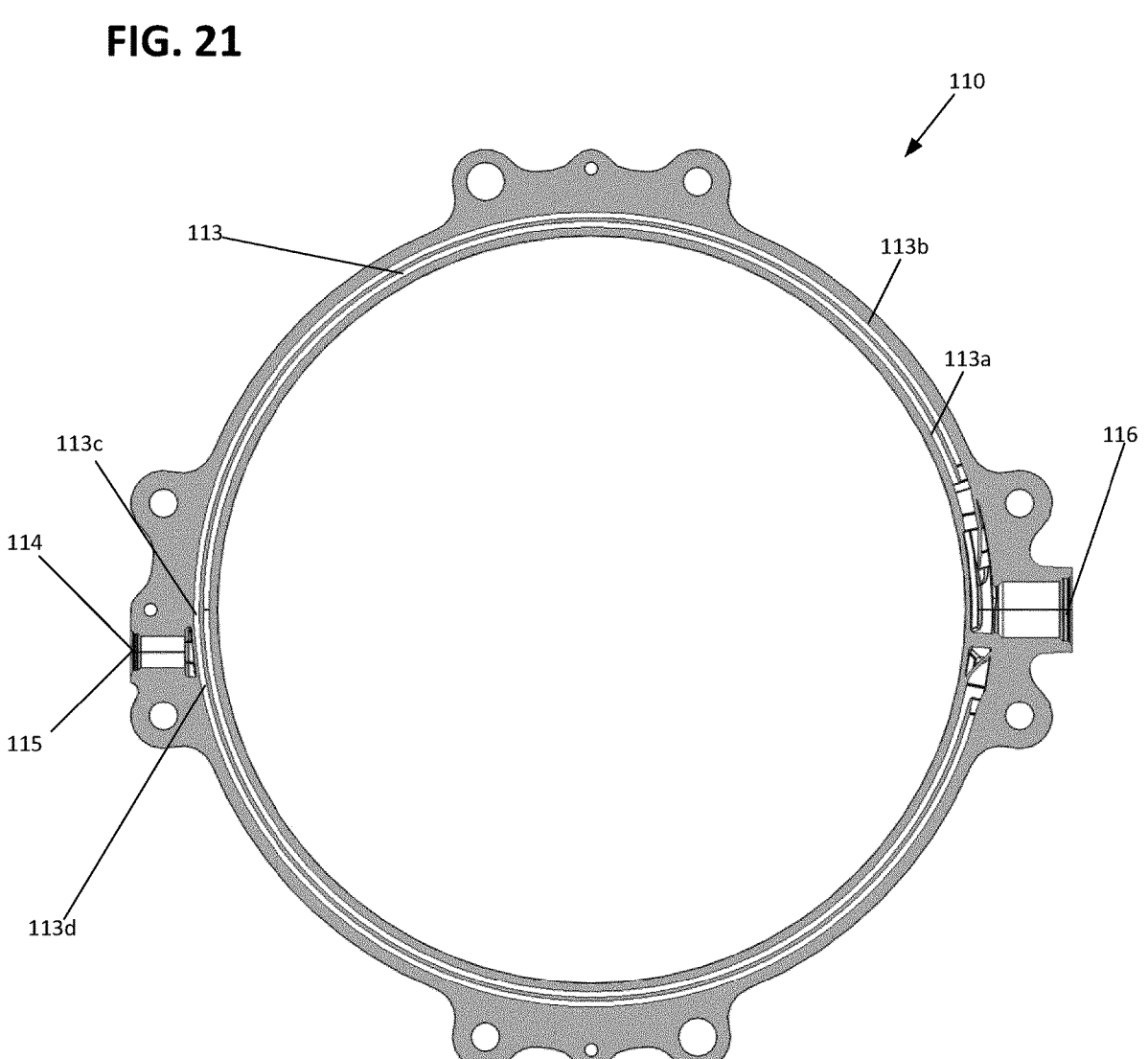
FIG. 21 is a cross-sectional end view of the first housing part of FIG. 14, showing an internal cooling passageway of the first housing part.
Figures 22, 23:
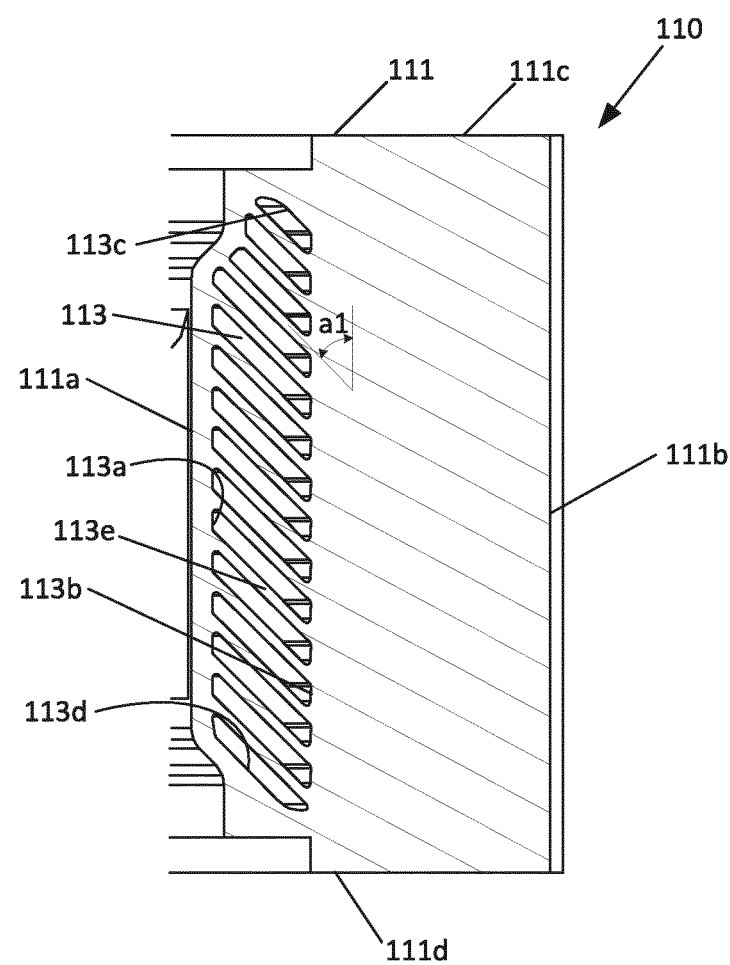
FIG. 22 is cross-sectional side view of a first portion of the first housing part of FIG. 14, showing a portion of the internal cooling passageway.
FIG. 23 is cross-sectional side view of the first housing part of FIG. 14, showing portions of the internal cooling passageway.
Figures 27, 28:
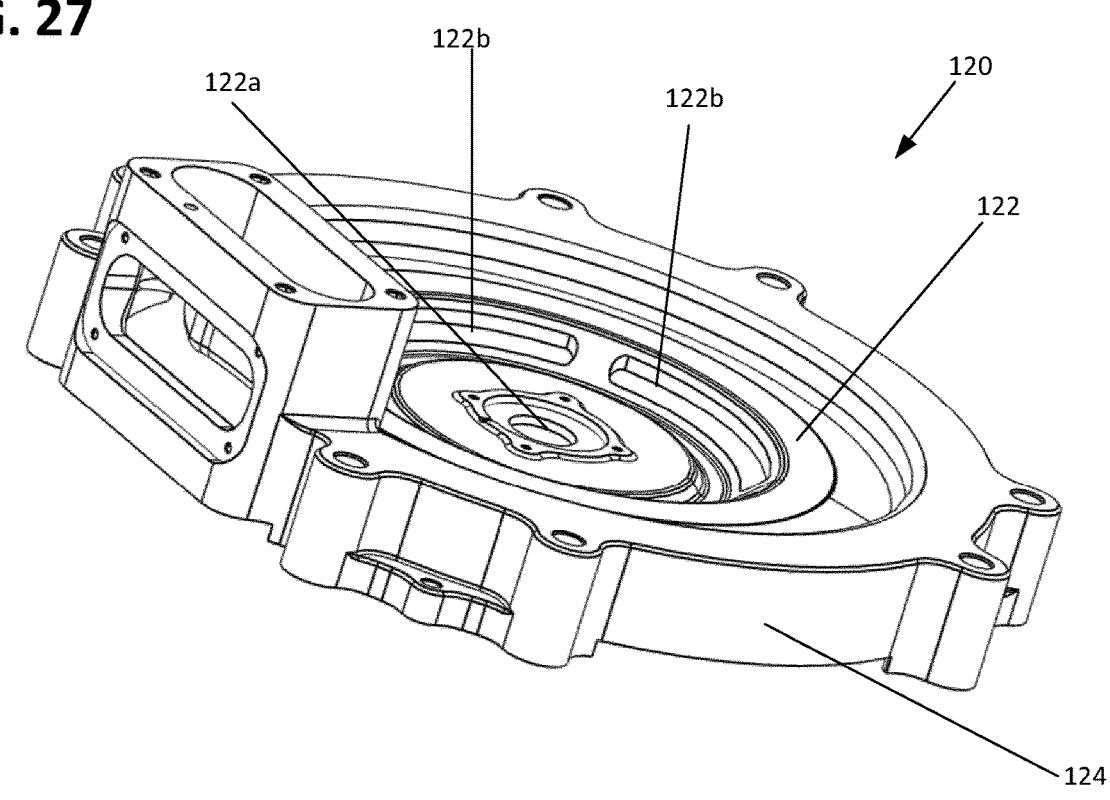
FIG. 27 is a first perspective view of a second housing part of the axial flux motor of FIG. 1.
FIG. 28 is a second perspective view of the second housing part shown in FIG. 27.
Figure 29:
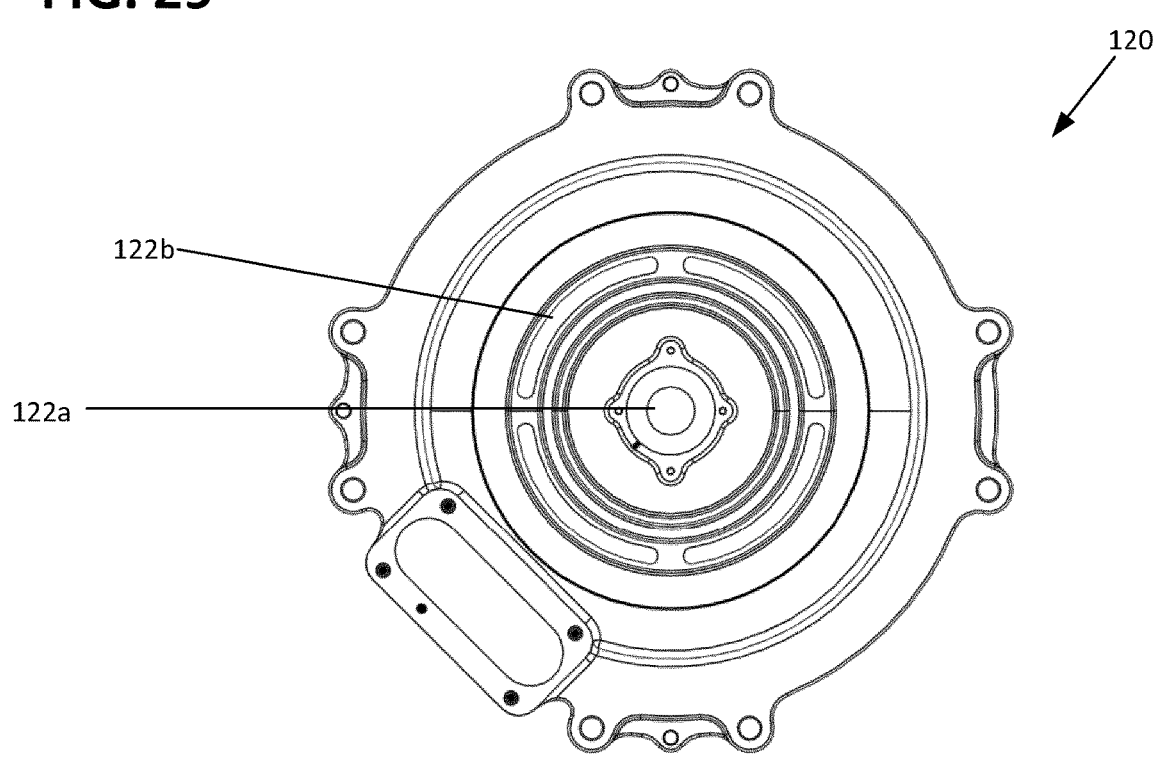
FIG. 29 is a first end view of the second housing part shown in FIG. 27.
Figure 30:
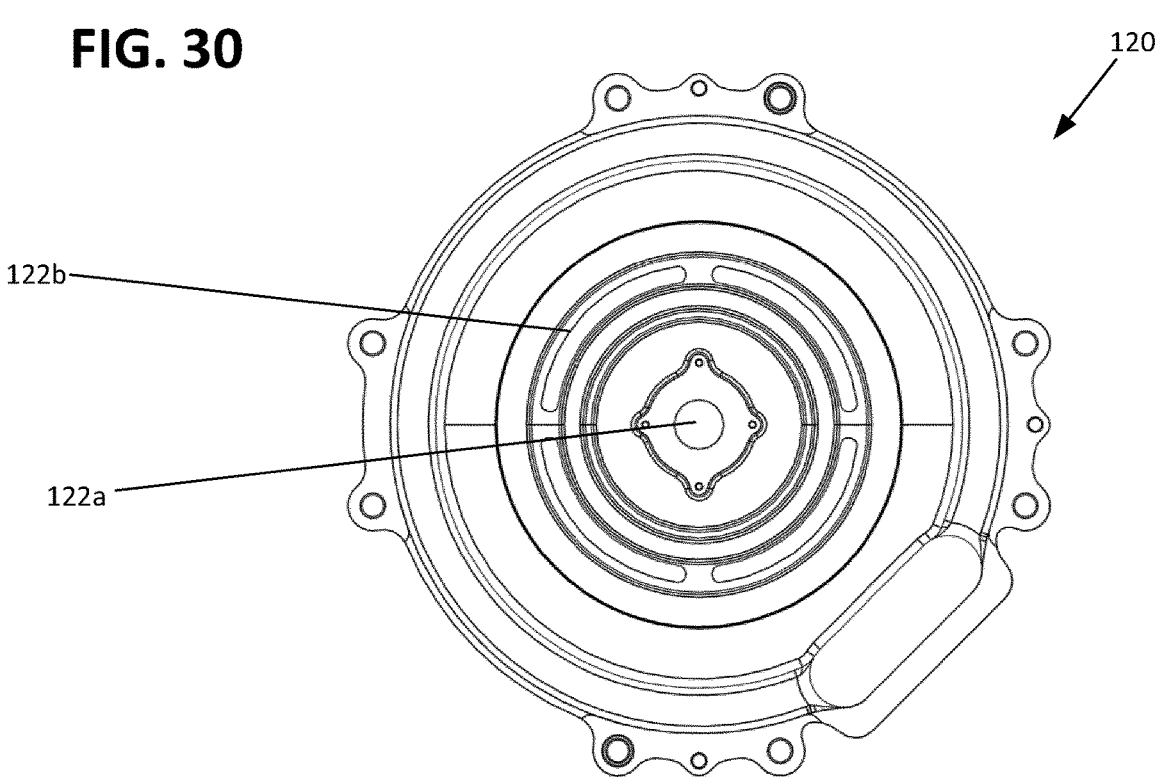
FIG. 30 is a second end view of the second housing part shown in FIG. 27.
Figure 31:
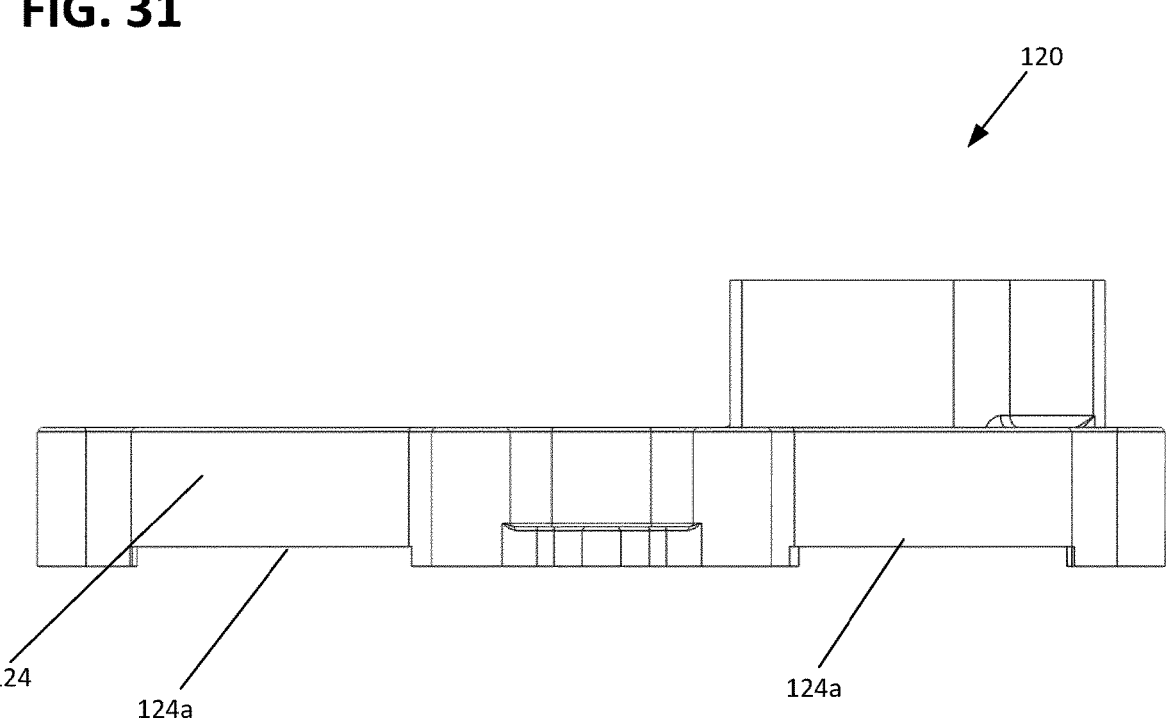
FIG. 31 is a side view of the second housing part shown in FIG. 27.
Figures 32, 33:
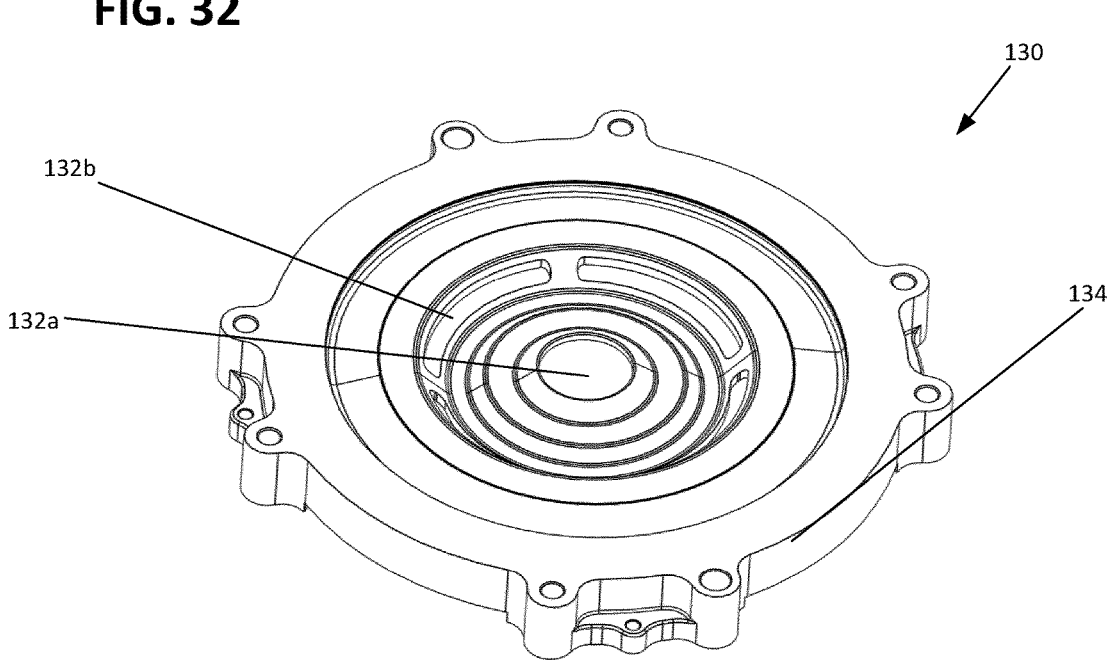
FIG. 32 is a first perspective view of a third housing part of the axial flux motor of FIG. 1.
FIG. 33 is a second perspective view of the third housing part shown in FIG. 32.
Figures 34, 35:
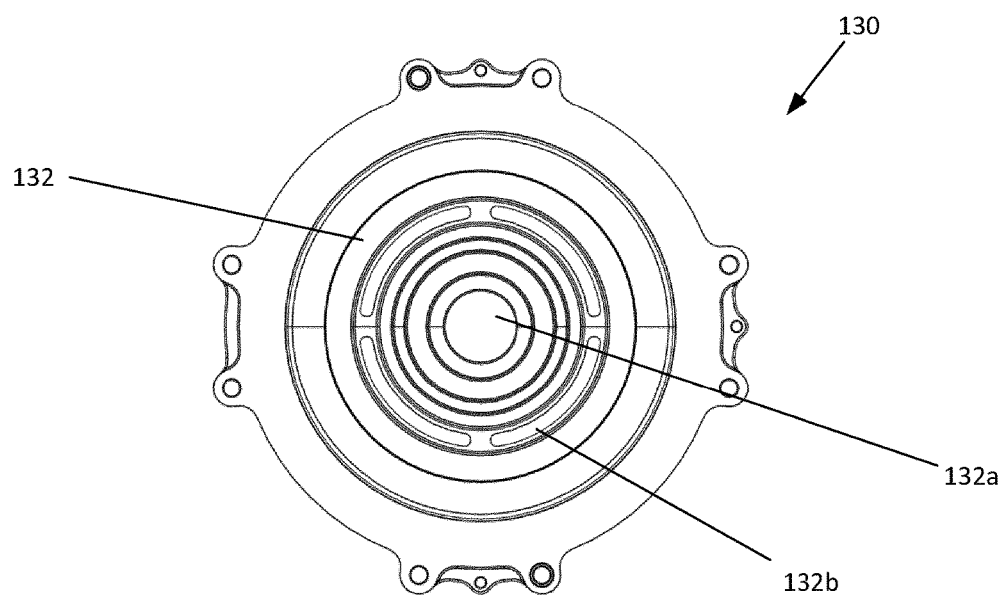
FIG. 34 is a first end view of the third housing part shown in FIG. 27.
FIG. 35 is a second end view of the third housing part shown in FIG. 27.
Figure 36:
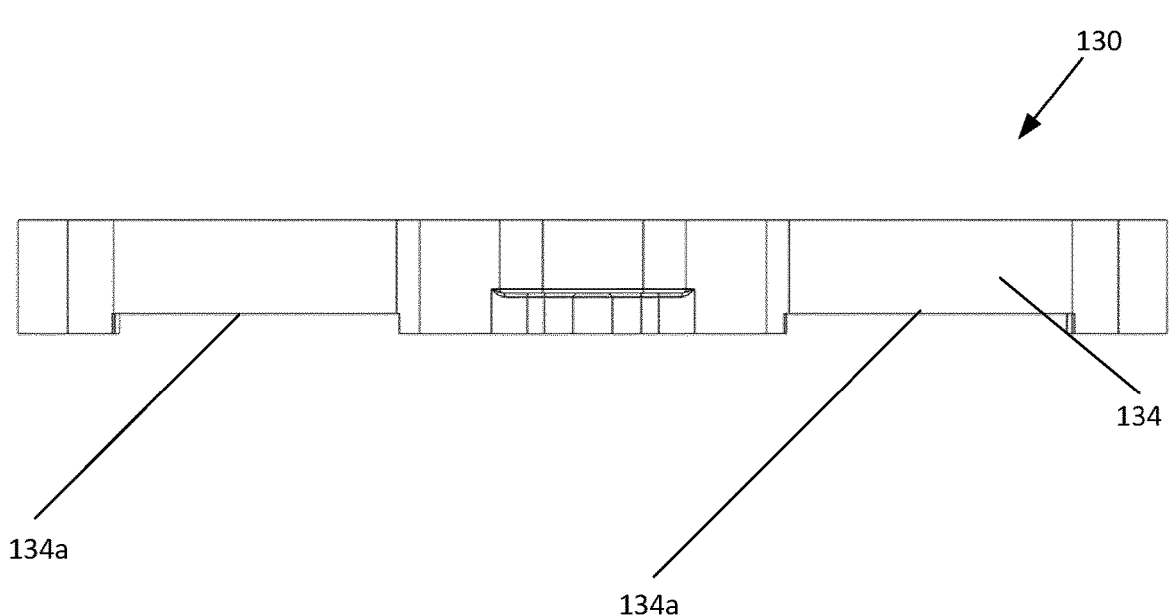
FIG. 36 is a side view of the third housing part shown in FIG. 27.
Figure 37:
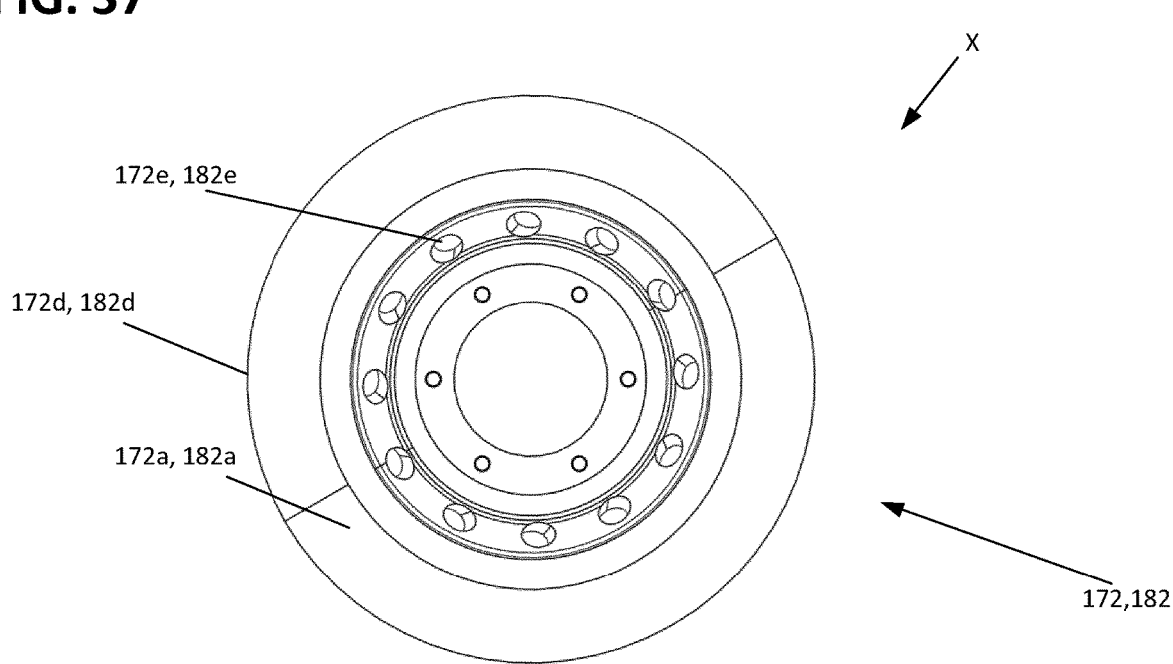
FIG. 37 is a first end view of a rotor of the axial flux motor of FIG. 1.
Figure 38:
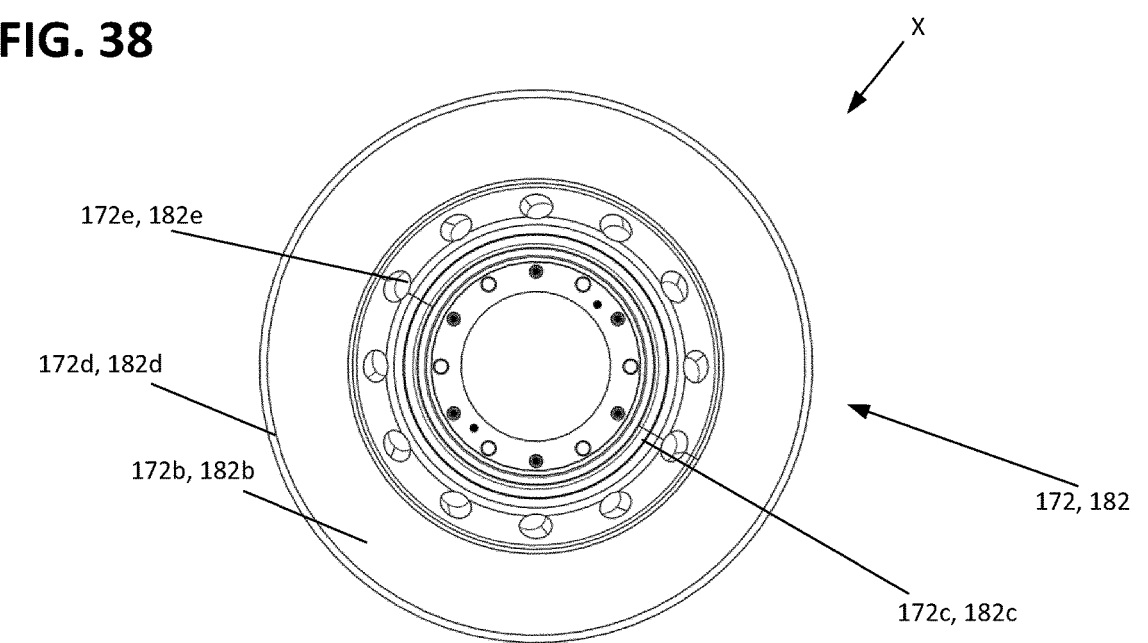
FIG. 38 is a second end view of the rotor shown in FIG. 37.
Figure 39:
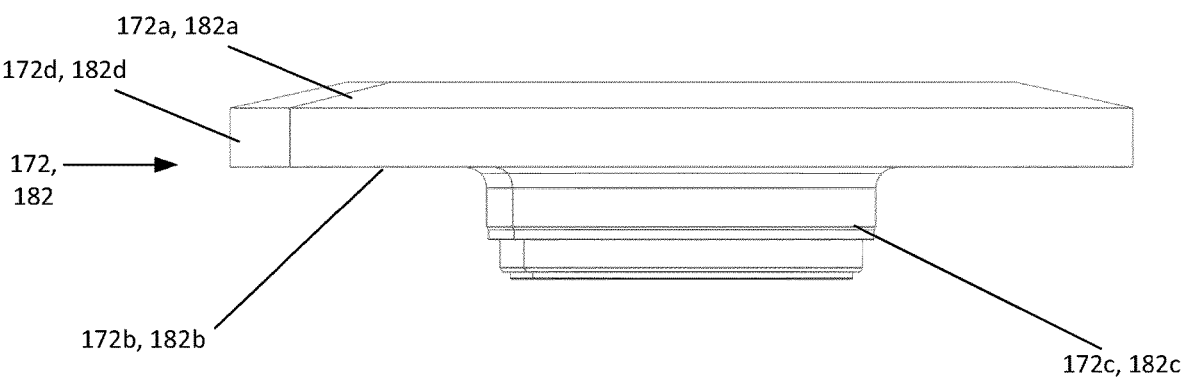
FIG. 39 is a side view of the rotor shown in FIG. 37.

As most easily see in the cross-sectional view provided at FIG. 7, a bearing assembly 190, located between the stator assembly 150 and the rotor assembly 160, is provided to facilitate rotation of the rotor assembly 160 relative to the stator assembly 150. As most easily viewed at FIG. 7, the bearing assembly 190 includes a sleeve 192 secured to the stator assembly 150 and supporting a pair of bearings 194.

With continued reference to FIG. 7, the rotor assembly 160 includes a first rotor subassembly 170 and a second rotor subassembly 180 that connect to each other and sandwich the stator assembly 150. In one aspect, the first and second rotor subassemblies 170, 180 include a first rotor part 172 and a second rotor part 182, respectively. The rotor parts 172, 182 define, in part, an end wall 172a defining an interior end face 172b, 182b, a hub portion 172c, 182c, and a circumferential outer wall 172d, 182d. The first and second rotor subassemblies 170, 180 further include a segmented back iron or yoke ring 174, 184 mounted to the end faces 172b, 182b of the rotor parts 172, 182 to which permanent magnets 176, 186 are mounted. Potting material 178, 188, such as an epoxy material, can be provided to bond the permanent magnets 176, 186 in place to the back iron or yoke ring 174, 184. In one aspect, the first and second rotor parts 172, 182 are coupled together at the hub portions 172c, 182c, for example by fasteners 162 such that the hub portions 172c, 182c capture the bearing assembly 190. Through this engagement, the bearing assembly 190 allows the rotor assembly first parts 172, 182 to rotate with respect to the stator assembly 150. The construction and mounting of the rotor assembly 160 results in the creation of an annular air gap 171, 181 between an end face 176a, 186a of the permanent magnets 176, 186 and the stator assembly 150. The air gaps 171, 181 allow the stator core 150, when an electrical current is applied, to generate a magnetic field that causes the rotation of the rotor assembly 160 via interaction with the permanent magnets 176, 186 without contact occurring between the permanent magnets 176, 186 and the stator assembly 150. As explained further in a later section, the air gaps 171, 181 also form part of a cooling air pathway to enable air-cooling of the stator assembly 150.

The axial flux electric motor 100 further includes an output component 140 mounted to the second rotor part 180, for example by fasteners or bolts. In some examples, the output component 140 can be integrally formed with the second rotor part 180. In one aspect, the rotor part 140 includes an output shaft portion 142 extending from the motor 100. Upon activation of the motor 100, the rotor assembly 160 rotates, thus causing the output shaft 142 to rotate about the longitudinal axis of rotation. The axial flux electric motor 100 further includes a resolver assembly 146 including a output component 146a mounted to the first rotor part 170, for example by fasteners 162. The output component 146a is shown as including a shaft part 146b which is connected to a resolver 146c which provides an input to a controller as to the rotational position of the rotor assembly 160, for example, with respect to the stator assembly 150. The resolver 146c is retained onto the shaft part 146b by a fastener 146d and is axially supported by the first housing part 120. A cover 146e may be provided to protect the resolver assembly 146.

Liquid Cooling Arrangement

In certain examples, the first housing part 110 is formed with a main body 111 surrounding and in contact with the stator assembly 150. The first housing part 110 may be referred to as a cooling jacket. In one aspect, the first housing part 110 defines and an internal passageway 113 through which a cooling fluid, such as water and/or glycol, can be circulated. In one aspect, the main body 111 includes a plurality of cooling fins 112 extending into regions located circumferentially between the electromagnets 152 of the stator assembly 150. As discussed below, the internal passageway 113 can extend into and/or through the cooling fins 112.

In the example shown, the internal passageway 113 forms an annulus within the main body 111 and thus extends around the entire circumference of the main body 111. The main body 111 is also shown as including an inlet port 114 for allowing the cooling fluid to enter the internal passageway 113 and an outlet port 115 for allowing the cooling fluid to exit the internal passageway. Although the ports 114, 115 are characterized as being inlet and outlet ports, respectively, each port may provide either function. The main body 111 is further shown as including a plurality of additional ports 116 extending into the cooling passageway. When the main body 111 is formed through an additive manufacturing process, the ports 116 allow for additional access into the passageway 113 such that compressed air or another fluid can be introduced into the internal passageway 113 to blow out or clear out debris, such as residual metal powder, out of the internal passageway 113. More or fewer ports 116 and more or fewer locations may be provided. In the example shown, the ports 116 are plugged after the internal passageway 113 has been appropriately cleaned. As the first housing part 110 is in direct physical contact (i.e. in thermal contact) with the stator assembly 150, heat is transferred from the stator assembly 150 to the main body 111 of the first housing part 110, and then to the cooling fluid within the internal passageway 113. The inlet and outlet ports 114, 115 can be connected to, for example, a cooling and circulation system including a pump and a heat exchanger (e.g. refrigeration system, liquid-to-air heat exchanger, etc.). Accordingly, the cooling fluid can be circulating from the outlet port 115, cooled through the heat exchanger, and returned back to the inlet port 114 at a lower temperature whereby the cooling fluid can further extract heat from the stator assembly 150.

As most easily viewed at FIGS. 14 to 26, the main body 111 of the first housing part 110 is an annular ring-shaped component defining an inner circumferential wall surface 111a, an outer circumferential wall surface 111b, and upper and lower wall surfaces 111c, 111d. The internal passageway 113 is formed between the wall surfaces 111a-111d and is proximate or adjacent the inner circumferential wall surface 111a. In one aspect, the internal passageway 113 extends between internal wall surfaces 113a-113d.

In the particular example shown, the internal passageway 113 is divided into multiple passageways by internal rib structures 113e extending between the wall surfaces 113a and 113b. By dividing the internal passageway 113 into multiple passageways, greater heat transfer effectiveness between the cooling fluid and the main body 111 can be obtained as the effective contact surface area between the main body 111 and the cooling fluid is greatly increased due to the surface area of the rib structures 113e. The rib structures 113e can also be arranged to maintain an optimal fluid flow conditions (i.e. decrease laminar flow) that result in increased heat transfer. In one aspect, the internal rib structures 113e extend at an angle a1, in a direction from wall surface 113b to wall surface 113a, that is an oblique angle to the inner surface 111a and to the longitudinal axis X. In the example shown, 14 internal rib structures 113e are provided extending at an angle a1 of about 35 degrees to subdivide the internal passageway 113 into 15 passageways. More or fewer rib structures 113e may be provided at various other angles. In one aspect, providing the rib structures 113e at the angle a1 increases the length and therefore surface area of the rib structures 113e, resulting in greater heat transfer effectiveness. Additionally, when the main body 111 is formed by an additive manufacturing process, such as an aluminum additive manufacturing process, printing the rib structures 113e at the angle a1 allows for an appropriate draft angle to exist such that the rib structures 113e can be appropriately printed without collapsing. Throughout the majority of the circumference of the main body 111, the internal rib structures 113e are parallel to each and to the wall surfaces 111c, 113d, and the inlet/outlet ports 114, 115 are adjacent one another. Accordingly, the cooling fluid enters the internal passageway 113 at one radial location, circulates through the circumferential length of the main body 111, and exits the internal passageway 113 at the same general radial location.

In some examples, the cooling passage 113 can extend into the cooling fins 112 to provide enhanced transfer capability. For example, the cooling fins 112 can be provided with a hollow construction with the hollow portion 113g forming a part of the cooling passageway 113, as schematically shown at FIG. 26. In one example arrangement, as shown at FIG. 26, a discrete individual passageway 113g can be provided within each cooling fin 112. Multiple passageways 113g may also be provided within each cooling fin 112.

As most easily seen at FIGS. 24 and 25, the internal rib structures 113e transition from their primary parallel arrangement such that they angle, bend, or curve towards the inlet/outlet ports 114, 115 before terminating short of the inlet/ports 114, 115. Such an arrangement enables for the cooling fluid to enter and leave the cooling passageway 113 in a less turbulent fashion, thus keeping related pressure losses to a minimum. It is noted that the inlet/outlet ports 114, 115 shown in the schematic at FIG. 25 as being alternatively located at the surfaces 113c, 113d and extending to surfaces 111c, 111d. FIG. 24 also shows a dividing rib 113f that extends between the wall surfaces 113a, 113b and closes off the internal passageway 113 such that the passageway starts and ends at the dividing rib 113f. Accordingly, fluid entering port 114/115 traverses the length of the cooling passageway 113 and is directed out of the other port 114, 115. It is noted that multiple inlet and outlet ports 114, 115 and multiple dividing ribs 113f can be provided at spaced intervals such that the cooling fluid traverses a selected radial segment of the main body 111.

In certain examples, the cooling fins 112 define radial lengths RL, and the cooling fins 112 are tapered such that widths W of the cooling finds 112 gradually reduce in size as the cooling fins 112 extend along their radial lengths RL towards the axis of rotation X. Preferably, the widths W of the cooling fins 112 taper along a majority of the radial lengths RL of the cooling fins 112. In the example depicted, the cooling fins 112 are configured to taper along their entire lengths or along substantially their entire lengths. In certain examples, the cooling fins 112 can have a generally triangular cross-sectional shape when cut along a cross-section line perpendicular to the axis of rotation X.

It will be appreciated that the cooling fins 112 can include base ends 112a integral with the main body 111 and free ends 112b spaced radially inwardly with respect to the base ends 112a. The cooling fins 112 have widths W that taper inwardly as the cooling fins 112 extend from the base ends 112a to the free ends 112b.

In certain examples, the main body 111 has an inner diameter and an outer diameter, and the cooling fins 96 have radial lengths RL that are less than 10, 15 or 20% as long as the inner diameter of the cooling jacket. In certain examples, the stator assembly 150 has an axial dimension H1 and the cooling fins 112 each have an axial dimension H2 that is less than 50% as long as the first axial dimension A1 of the stator assembly 150.

Air Cooling Arrangement

In one aspect, the motor 100 defines an air cooling arrangement in which ambient air is actively drawn through the interior of the housing by the motor 100 to cool the stator assembly 150 and/or the rotor assembly 160. In one aspect, the first and second rotor parts 172, 182 are provided with apertures 172e, 182e located radially inward from the permanent magnets 176, 186. The apertures 172e, 182e are provided with a shape that enable the apertures 172e, 182e to function as an air-moving feature to draw ambient air into and through the motor housing 102 via air cooling passageways 200, 202. In the example shown, six apertures 172e, 182e are provided. However, more or fewer apertures 172e, 182e may be provided. As schematically illustrated at FIG.

10, the air cooling passageways 200, 202 are shown as extending from the air intake apertures 122b, 132b in the housing parts 120, 130; through interstitial spaces 200a, 202a defined between the housing parts 120, 130 and the rotor parts 172, 182; through the apertures 172e, 182e; through interstitial spaces 200b, 202b defined between the rotor parts 172, 182; through the air gaps 171, 181 defined between the permanent magnets 176, 186 and the stator assembly 150; through interstitial spaces 200c, 202c defined between the stator assembly 150/first housing part 100 and the housing parts 120, 130; and out of the notches or openings 124a, 134a.

In some examples, and in the example shown, ambient cooling air moves through the air passageways 200, 202 in an outward radial direction relative to the axis of rotation 30. In certain examples, and in the example shown, the cooling air moves through the air gaps 171, 181 in a direction from inner diameters toward outer diameters of the first and second rotor parts 172, 182. In certain examples, and in the example shown, the cooling air is drawn into the motor housing 102 in an axial direction, and is forced out of the motor housing 102 by the air passageways 200, 202 in a radial direction. In certain examples, and in the example shown, a lower pressure plenum can be defined axially between the first and second rotor parts 172, 182 and the second and third housing parts 120, 130.

Figure 40:
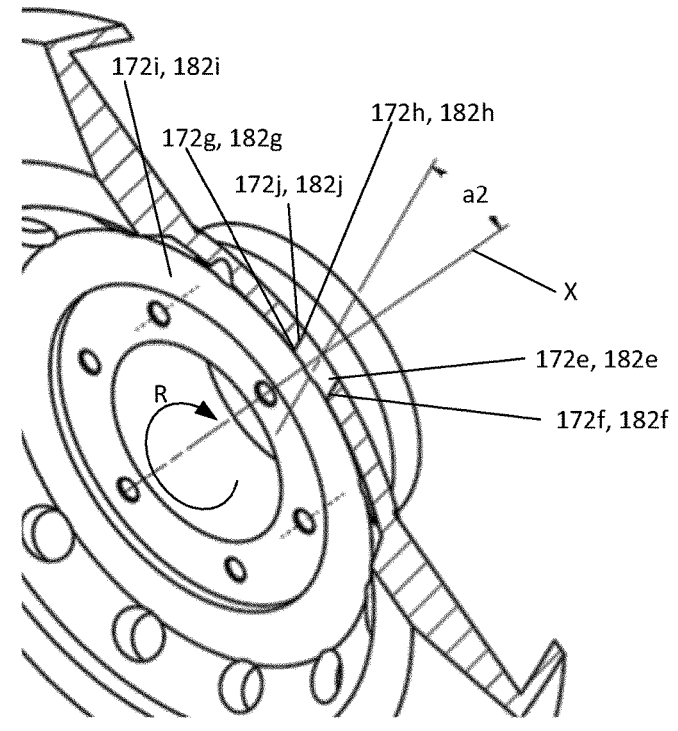
FIG. 40 is a perspective cross-sectional view of a portion of the rotor shown in FIG. 37.
Figure 40A:
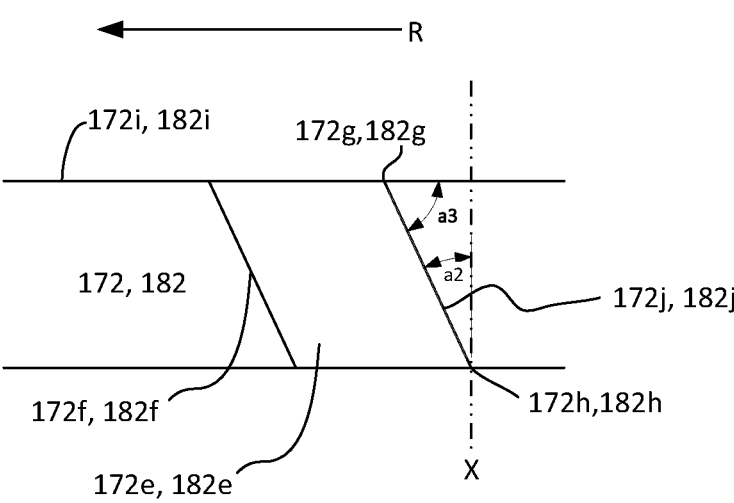
FIG. 40A is a schematic cross-sectional side view of an air-moving feature of the rotor shown in FIG. 37.

As most easily viewed at FIGS. 40 and 41, the apertures 172e, 182e that function as air-moving features are formed with a sidewall structure 172f, 182f that is disposed at an oblique angle a2 to the longitudinal axis X. The angle a2 allows the apertures 172e, 182e to be oriented at an angle such that the trailing side 172j, 182j of an inlet end 172g, 182g of the apertures 172e, 182e is presented at a forward angle of attack (i.e. angle a2) as the rotor parts 172, 182 rotate in a rotational direction R. Stated another way, the trailing side 172g, 182g of the sidewall structures 172f, 182f is presented at an acute angle a3 (i.e. complementary angle to a2) with respect to the main surface 172i, 182i through which the apertures 172e, 182e are formed to result in the apertures 172e, 182e having a forward angle of attack when rotated in the rotational direction R. As such, the angled apertures 172e, 182e function to scoop or capture air at the inlet end 172g, 182g and discharge the air at a higher velocity and pressure at an outlet end 172h, 182h. In some examples, the angle a2 is between 10 degrees and 45 degrees. In some examples, the angle a2 is between 15 degrees and 35 degrees. In the example shown, the angle a2 is 25 degrees. It is noted that since the first and second rotor parts 172, 182 are oppositely facing, but rotate in the same rotational direction R, the openings 172e are angled in an opposite direction in comparison to the openings 182e such that all of the openings are oriented with a proper angle of attack to scoop and direct air into the interior of the housing assembly 102.

Figure 40B:
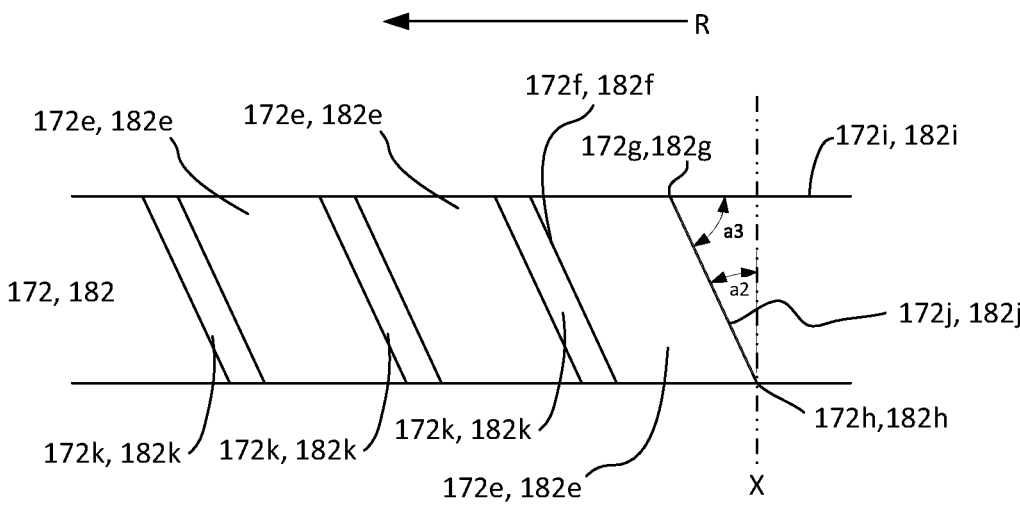
FIG. 40B is a schematic cross-sectional side view of an alternative air-moving feature usable with the rotor shown in FIG. 37.

In some examples, the air-moving features are blades, scoops, fins or other structures capable of generating air movement as the rotor parts 172, 182 are rotated about the axis of rotation X. Preferably, the air-moving features are capable of drawing air to reduce the pressure in the plenum space 202a, and then forcing the air to flow into the air gaps 171, 181 at a higher pressure such that the air moves through the air gaps 171, 181 in an outward radial direction relative to the axis of rotation X. Thus, the air moving features can provide each rotor part 171, 181 with a high pressure side adjacent the corresponding air gap in the space 200b, 202b and in communication with radial outlets 124a, 134a in the housing parts 120, 130, and a low pressure side adjacent a plenum in communication with an air inlet. The sets of openings 172e, 182e in the rotor parts 172, 182 can be arranged along circles that surround the axis of rotation X. In certain examples, the openings 172e, 182e are radially closer to inner diameters of the rotor parts 172, 182 than outer diameters of the rotor parts 172, 182. In the depicted example, the sidewalls 172f, 182f of the openings 172e, 182e are defined as cylindrical openings drilled at an oblique angle through the rotor parts 172, 182. Other shapes are possible. For example, the sidewalls 172f, 182f could be provided with frustoconical, oblong, obround, and/or other types of shapes cylindrical in shape and arranged at an oblique angle to the axis. Referring to FIG. 40B, the apertures 172e, 182e can also be formed between a plurality of radially extending blades 172k, 182k, which may be rectangular or airfoil shaped, that similarly define a forward angle of attack a2 with respect to the rotation direction R. It is noted that in the depicted examples, the air-moving features 172e, 182e are formed within the rotor parts 172, 182 by removing material that would otherwise be present in the rotor parts 172, 182 and are formed without adding material to the rotor parts 172, 182. Although other configurations are possible by adding material, as contemplated above, the depicted examples save rotor weight while also avoid increasing the axial dimension of the motor 100.

Stator Core

With reference to FIGS. 45 to 49, the stator cores 154 each include a core body 154a which extends along a core axis X2 between first and second opposite axial ends 154b, 154c of the core body 154a. The first axial ends 154b define first end faces 154d that face in a first axial direction D1 and the second axial ends 154c define second end faces 154e that face in a second axial direction D2 opposite from the first axial direction D1. As can be seen at FIGS. 41 to 44, the wire coils 156 are wound about the core axes X2 and are located between the first and second axial ends 154b, 154c of the core bodies 154a. The first and second axial ends 154b, 154c of each stator core 154 are adapted to define opposite magnetic poles of each corresponding electromagnet 152.

In certain examples, the stator cores 154, shown in FIGS. 45 to 49, of the stator assembly 150 can include first and second face plates 154f, 154g that project laterally outwardly from the core bodies 154a respectively at the first and second axial ends 154b, 154c of the core bodies 154a. The wire coils 156 are wound about the core bodies 154a between the first and second face plates 154f, 154g. In one aspect, the stator cores 154 have an I-shaped cross-sectional profile when a cross-section is taken along a cross-section line perpendicular with respect to the core axis X2. In certain examples, the stator cores 154 are each defined by a plurality of laminate pieces 154m, for example 0.1 millimeter (mm) cobalt steel bonded laminate pieces 154m, stacked together along the core axes X2. In such an example, the laminate pieces each have an I-shaped cross-sectional profile when cut along a cross-section line perpendicular with respect to the core axis X2. The laminate pieces can have I-shaped profiles that are progressively larger as the laminate pieces are stacked along the core axis such that one end of the core body 154a has a larger profile than the opposite end of the core body 154a. In the example shown at FIGS. 45 to 49, the laminate pieces initially have the same dimensioned I-shaped profile, and the stator core 154 is machined to have the depicted shape after the laminate pieces have been stacked and bonded together. In the example shown at FIG. 46, four sets of differently sized laminate pieces are joined

Figure 45:
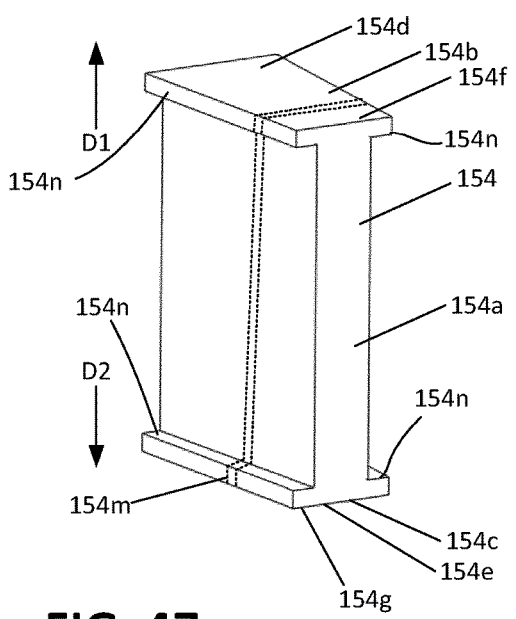
FIG. 45 is a perspective view of the stator core shown in FIG. 41.
Figure 46:
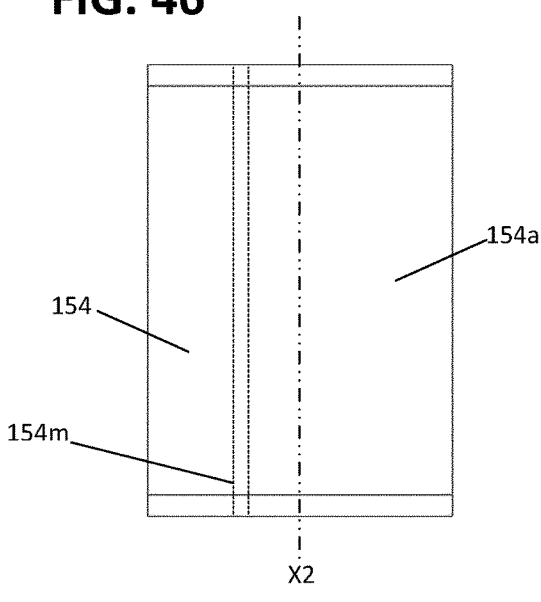
FIG. 46 is a first side view of the stator core shown in FIG. 41.
Figure 47:
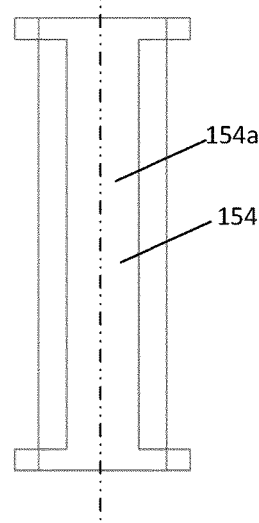
FIG. 47 is a second side view of the stator core shown in FIG. 41.
Figure 48:
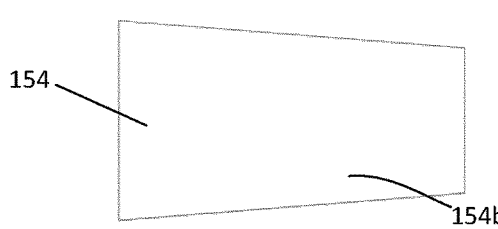
FIG. 48 is an end view of the stator core shown in FIG. 41.
Figure 49:
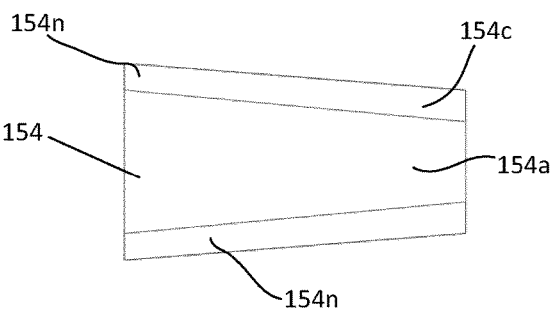
FIG. 49 is a cross-sectional end view of the stator core shown in FIG. 41.
Figure 50:
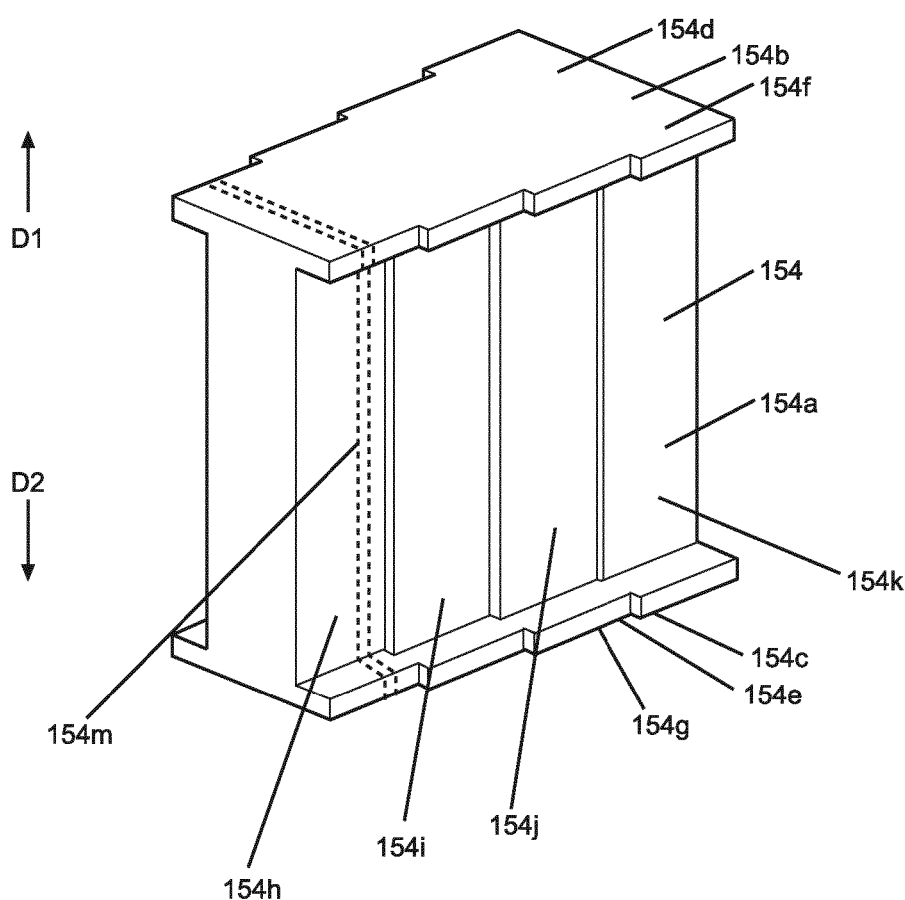
FIG. 50 is a perspective view of an alternate stator core construction usable with the stator assembly of the motor shown in FIG. 1.

17 together to form stepped sections 154*h*, 154*i*, 154*j*, and 154*k*. Accordingly, with such an embodiments, some of the rotor plates have larger surface areas than others of the rotor plates. In one aspect, the stator core bodies 154*a* and the face plates 154*f*, 154*g* have trapezoidal outer perimeter or profile, as depicted at FIGS. 45, 48, and 49, wherein the faceplates 154*f*, 154*g* define overhanging portions 154*n* extending over the sides of the core body 154*a*.

It will be appreciated that various components of the motor 100, such as the housing parts 110, 120, 130, the rotor parts 172, 182, and the stator cores 154 can be manufactured using an additive manufacturing process.

Controller

It will be appreciated that a controller can be used to control operation of the electric motor 100. The controller can include one or more processors. The processors can interface with software, firmware and/or hardware. Additionally, the processors can include digital or analog processing capabilities and can interface with memory (e.g., random access memory, read-only memory, or other data storage). In certain examples, the processors can include a programmable logic controller, one or more microprocessors, or like structures. The processors can interface with sensors such as rotary encoders, such as the resolver 146, that detect the rotational position of the rotor assembly 160 relative to the stator assembly 150. Based on the sensed rotational position of the rotor assembly 160, the controller can alternate the direction of electrical current provided to the electromagnets 152 of the stator assembly 150 such that magnetic attraction/repulsion between the electromagnets 152 of the stator assembly 150 and the permanent magnets 176, 186 of the rotor assembly 160 causes the rotor assembly 160 and the shaft 142 connected thereto to rotate about the axis of rotation X relative to the stator assembly 150.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

We claim:

1. An axial flux electric motor comprising:
   a) a housing assembly arranged along a longitudinal axis, the housing assembly comprising one or more air outlets on a circumferential outer wall of the housing assembly;
   b) a stator assembly mounted within the housing assembly, the stator assembly including a plurality of stator cores with wire coils, the stator assembly defining first and second axial faces; and
   c) a rotor assembly mounted within the housing assembly, the rotor assembly being rotatable with respect to the stator assembly and including an output shaft extending out of the housing assembly, the rotor assembly including a first rotor part carrying a first plurality of permanent magnets facing and spaced from the stator assembly first axial face to define a first air gap and a second rotor part carrying a second plurality of permanent magnets facing and spaced from the stator assembly second axial face to define a second air gap, the first rotor part including a first air-movement feature extending through the first rotor part and configured to, when the first rotor part is rotating, draw air into the housing assembly and through the first air gap, the rotor assembly further including a hub radially inward from the stator cores, the rotor assembly further including a hub radially inward from the stator cores, wherein the first and second rotor parts each include an inner portion defining the hub, an outer portion encircling the permanent magnets, and a connection portion extending from the inner portion to the outer portion at an oblique angle, wherein the hub is configured to capture a bearing assembly between the hub and the stator assembly, wherein the inner portions of the first rotor part and the second rotor part are coupled together;

d) wherein the first air-movement feature extends axially relative to the longitudinal axis of the housing assembly and comprises at least one aperture extending through the connection portion of the first rotor part, the at least one aperture defining first and second sidewalls that are both oriented obliquely relative to the longitudinal axis along the entire length of the first and second sidewalls, and
   e) wherein the air is drawn axially through the at least one aperture into the rotor assembly and moves axially through the first rotor part, and subsequently passes radially through an interstitial space to the first air gap and exits the axial flux electric motor radially through the one or more air outlets in fluid communication with the first air gap.

2. The axial flux electric motor of claim 1, wherein the housing assembly includes one or more air inlets in fluid communication with the first rotor part.

3. The axial flux electric motor of claim 2, wherein the one or more air inlets are radially closer to the longitudinal axis in comparison to the one or more air outlets.

4. The axial flux electric motor of claim 1, wherein the first air-movement feature includes a plurality of openings defined within the first rotor part.

5. The axial flux electric motor of claim 4, wherein the plurality of openings are oriented at an oblique angle to the longitudinal axis.

6. The axial flux electric motor of claim 4, wherein the plurality of openings are defined as cylindrical openings.

7. The axial flux electric motor of claim 1, further comprising:
   a) the second rotor part including a second air-movement feature configured to, when the second rotor part is rotating, draw air into the housing assembly and through the second air gap.

8. The axial flux electric motor of claim 7, wherein the second air-movement feature includes a plurality of second openings defined within the second rotor part.

9. The axial flux electric motor of claim 8, wherein the second plurality of openings are oriented at an oblique angle to the longitudinal axis.

10. The axial flux electric motor of claim 8, wherein the second plurality of openings are defined as cylindrical openings.

11. The axial flux electric motor of claim 1, wherein the first air-movement feature is located radially inward of the stator assembly.

12. The axial flux electric motor of claim 1, wherein the at least one aperture is at least partially defined by a sidewall disposed at an oblique angle relative to the longitudinal axis, the oblique angle having a forward angle of attack such that airflow through the at least one aperture is induced upon rotation of the first rotor part.

13. The axial flux electric motor of claim 1, wherein the bearing assembly is against the hub and a sleeve of the stator assembly.

14. The axial flux electric motor of claim 1, wherein the first rotor part includes an end opposite to and parallel with the hub, and wherein the end of the first rotor part surrounding the permanent magnets and a yoke.

15. The axial flux electric motor of claim 1, wherein a first portion of the hub defined by the first rotor part and a second portion of the hub defined by the second rotor part are recessed to capture the bearing assembly.

16. An axial flux electric motor comprising:

a) a motor shaft defining a longitudinal axis of rotation about which the motor shaft is rotatable;

b) a stator assembly including a plurality of electromagnets spaced circumference about the longitudinal axis of rotation, the electromagnets each including a stator core about which a wire coil is wound, the stator cores each including a core body which extends along a core axis between first and second opposite axial ends, the core axes being parallel to the longitudinal axis of rotation, the first axial ends defining first end faces that face in a first axial direction and the second axial ends defining second end faces that face in a second axial direction opposite from the first axial direction, the wire coils being wound about the core axes between the first and second axial ends, wherein the first and second opposite axial ends of each stator core are adapted to define opposite magnetic poles of each corresponding electromagnet;

c) a rotor assembly coupled to the motor shaft, the rotor assembly and the motor shaft being adapted to rotate together relative to the stator assembly about the longitudinal axis of rotation, the rotor assembly including a first rotor including a first rotor plate and a plurality of first permanent magnets carried by the first rotor plate, the first permanent magnets being circumferentially spaced about the longitudinal axis of rotation and having first permanent magnet end faces positioned to oppose the first axial end faces of the stator cores, the first permanent magnet end faces being spaced from the first axial end faces of the stator cores by a first air gap, the rotor assembly also including a second rotor including a second rotor plate and a plurality of second permanent magnets carried by the second rotor plate, the plurality of second permanent magnets being circumferentially spaced about the longitudinal axis of rotation and having second permanent magnet end faces positioned to oppose the second axial end faces of the stator cores, the second permanent magnet end faces being spaced from the second axial end faces of the stator cores by a second air gap, the rotor assembly further including a hub radially inward from the stator cores, wherein the first and second rotor plates each include an inner portion defining the hub, an outer portion encircling the permanent magnets, and a connection portion extending from the inner portion to the outer portion at an oblique angle, wherein the hub is configured to capture a bearing assembly between the hub and the stator assembly, wherein the inner portions of the first rotor plate and the second rotor plate are coupled together; and d) the first and second rotor plates being configured for moving cooling air through the first and second air gaps, wherein the cooling air flows axially into one or more passageways extending axially relative to the longitudinal axis of rotation and turns such that the cooling air flows radially out of the axial flux electric motor through one or more outlets located radially relative to the longitudinal axis of rotation, wherein the one or more passageways comprise first and second sidewalls through the connection portions of the first and second rotor plates, the entire length of the first and second sidewalls are both oriented obliquely relative to the longitudinal axis of rotation.

17. The axial flux electric motor of claim 16, wherein the cooling air moves through the first and second air gaps in a direction from inner diameters toward outer diameters of the first and second rotor plates.

18. The axial flux electric motor of claim 16, wherein a housing encloses the stator assembly and the rotor assembly, wherein the cooling air is drawn into the housing by the first and second rotor plates in an axial orientation, and is forced out of the housing by the rotor plates in a radial orientation.

19. The axial flux electric motor of claim 18, wherein a circumferential wall of the housing surrounds the stator assembly, and a first axial end wall of the housing covers the first rotor plate and a second axial end wall of the housing covers the second rotor plate.

20. The axial flux electric motor of claim 19, wherein the circumferential wall includes an integrated cooling jacket defining a cooling passage through which cooling fluid is pumped, wherein the cooling fluid is a cooling liquid, wherein the cooling passage is defined within the circumferential wall, and wherein the cooling passage extends circumferentially about the longitudinal axis of rotation.

21. The axial flux electric motor of claim 20, further comprising radial cooling fins that project radially inwardly from the circumferential wall into space between the electromagnets of the stator assembly.

22. The axial flux electric motor of claim 16, wherein the one or more passageways are part of a first air-movement feature, and the second rotor plate includes a second air-movement feature for moving the cooling air through the second air gap, wherein the first and second air-movement features include a plurality of passageways defined through the first and second rotor plates arranged along a circle that surrounds the longitudinal axis of rotation.

23. The axial flux electric motor of claim 22, wherein the plurality of passageways are defined through truncated conical walls of the first and second rotor plates.

24. An axial flux electric motor comprising:

a) a housing assembly arranged along a longitudinal axis, the housing assembly comprising one or more air outlets on a circumferential outer wall of the housing assembly;

b) a stator assembly mounted within the housing assembly, the stator assembly including a plurality of stator cores with wire coils, the stator assembly defining first and second axial faces; and c) a rotor assembly mounted within the housing assembly, the rotor assembly being rotatable with respect to the stator assembly and including an output shaft extending out of the housing assembly, the rotor assembly including a first rotor part carrying a first plurality of permanent magnets facing and spaced from the stator assembly first axial face to define a first air gap and a second rotor part carrying a second plurality of permanent magnets facing and spaced from the stator assembly second axial face to define a second air gap, the first rotor part including a first air-movement feature extending through the first rotor part and configured to, when the first rotor part is rotating, draw air into the housing assembly and through the first air gap, the rotor assembly further including a hub radially inward from the stator cores, wherein the first and second rotor parts each include an inner portion defining the hub, an outer portion encircling the permanent magnets, and a connection portion extending from the inner portion to the outer portion at an oblique angle, wherein the hub is configured to capture a bearing assembly between the hub and the stator assembly, wherein the inner portions of the first rotor part and the second rotor part are coupled together;

d) wherein the first air-movement feature extends axially relative to the longitudinal axis of the housing assembly and comprises at least one aperture extending through the connection portion of the first rotor part, the at least one aperture having a centerline oriented obliquely relative to the longitudinal axis along the entire length of the at least one aperture; and e) wherein the air is drawn axially through the at least one aperture into the rotor assembly and moves axially through the first rotor part, and subsequently passes radially through an interstitial space to the first air gap, and exits the axial flux electric motor radially through the one or more air outlets in fluid communication with the first air gap.

25. The axial flux electric motor of claim 24, wherein the centerline extends radially away from the longitudinal axis as the centerline extends through the at least one aperture to the stator assembly.

* * * * *